US011275519B2

(12) United States Patent
Ramachandran et al.

(10) Patent No.: US 11,275,519 B2
(45) Date of Patent: Mar. 15, 2022

(54) FORMING LIGHTWEIGHT SNAPSHOTS FOR LOSSLESS DATA RESTORE OPERATIONS

(71) Applicant: Nutanix, Inc., San Jose, CA (US)

(72) Inventors: Parthasarathy Ramachandran, Palo Alto, CA (US); Bharat Kumar Beedu, Bangalore (IN); Monoreet Mutsuddi, San Jose, CA (US); Vanita Prabhu, Bengaluru (IN); Mayur Vijay Sadavarte, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/200,502

(22) Filed: Nov. 26, 2018

(65) Prior Publication Data

US 2019/0354289 A1 Nov. 21, 2019

Related U.S. Application Data

(60) Provisional application No. 62/591,090, filed on Nov. 27, 2017, provisional application No. 62/591,098, (Continued)

(51) Int. Cl.
G06F 3/06 (2006.01)
(52) U.S. Cl.
CPC ............ G06F 3/0647 (2013.01); G06F 3/065 (2013.01); G06F 3/0619 (2013.01); (Continued)
(58) Field of Classification Search
USPC ........................................................ 711/162
See application file for complete search history.

(56) References Cited

U.S. PATENT DOCUMENTS 5,592,618 A 1/1997 Micka et al.
6,493,796 B1 * 12/2002 Arnon ................. G06F 11/2064
709/213

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Michael Krofcheck
*Assistant Examiner* — John Francis Wojton
(74) *Attorney, Agent, or Firm* — Vista IP Law Group, LLP

(57) ABSTRACT

Systems for high performance restore of data to storage devices. A method embodiment commences upon identifying a plurality of virtual disks to be grouped together into one or more consistency sets. Storage I/O commands for the plurality of virtual disks of the consistency sets are captured into multiple levels of backup data. On a time schedule, multiple levels of backup data for the virtual disks are cascaded by processing data from one or more higher granularity levels of backup data to one or more lower granularity levels of backup data. A restore operation can access the multiple levels of backup data to construct a restore set that is consistent to a designated point in time or to a designated state. Multiple staging areas can be maintained using lightweight snapshot data structures that each comprise a series of captured I/Os to be replayed over other datasets to generate a restore set.

22 Claims, 23 Drawing Sheets

Related U.S. Application Data filed on Nov. 27, 2017, provisional application No. 62/591,123, filed on Nov. 27, 2017.

(52) U.S. Cl.
CPC .......... *G06F 3/0659* (2013.01); *G06F 3/0664* (2013.01); *G06F 3/0673* (2013.01)

(56) References Cited

U.S. PATENT DOCUMENTS

| | | | |
|---|---|---|---|
| 7,136,974 | B2 | 11/2006 | Burton et al. |
| 7,346,805 | B1 * | 3/2008 | Scharland ............ G06F 11/2071 711/156 |
| 7,467,266 | B2 | 12/2008 | Burton et al. |
| 7,515,287 | B2 * | 4/2009 | Kitada ..................... G06F 3/121 358/1.14 |
| 7,519,628 | B1 | 4/2009 | Leverett et al. |
| 7,574,418 | B1 | 8/2009 | Patterson et al. |
| 7,725,671 | B2 | 5/2010 | Prahlad et al. |
| 7,734,669 | B2 | 6/2010 | Kottomtharayil et al. |
| 7,765,187 | B2 | 7/2010 | Bergant et al. |
| 7,779,295 | B1 | 8/2010 | Shah et al. |
| 7,840,533 | B2 | 11/2010 | Prahlad et al. |
| 7,840,536 | B1 * | 11/2010 | Ahal ..................... G06F 16/1815 707/648 |
| 8,140,772 | B1 | 3/2012 | Yang |
| 8,447,728 | B2 | 5/2013 | Prahlad et al. |
| 8,549,518 | B1 | 10/2013 | Aron et al. |
| 8,601,473 | B1 | 12/2013 | Aron et al. |
| 8,762,335 | B2 | 6/2014 | Prahlad et al. |
| 8,826,283 | B2 | 9/2014 | Chen et al. |
| 8,850,130 | B1 | 9/2014 | Aron et al. |
| 8,914,567 | B2 | 12/2014 | Miroshnichenko et al. |
| 9,069,704 | B2 | 6/2015 | Schreter et al. |
| 9,081,754 | B1 * | 7/2015 | Natanzon ............ G06F 11/2064 |
| 9,223,659 | B1 | 12/2015 | Natanzon et al. |
| 9,268,602 | B2 | 2/2016 | Prahlad et al. |
| 9,311,242 | B1 | 4/2016 | Banerjee |
| 9,405,481 | B1 | 8/2016 | Cohen et al. |
| 9,626,212 | B2 | 4/2017 | Beveridge et al. |
| 9,740,577 | B1 | 8/2017 | Chakraborty et al. |
| 9,740,723 | B2 | 8/2017 | Prahlad et al. |
| 9,772,866 | B1 | 9/2017 | Aron et al. |
| 9,946,569 | B1 | 4/2018 | Beedu et al. |
| 10,210,048 | B2 | 2/2019 | Sancheti |
| 10,248,657 | B2 | 4/2019 | Prahlad et al. |
| 10,255,137 | B1 | 4/2019 | Panidis et al. |
| 10,423,634 | B1 | 9/2019 | Shemer et al. |
| 10,437,783 | B1 | 10/2019 | Cohen et al. |
| 10,484,179 | B1 | 11/2019 | Natanzon et al. |
| 10,545,682 | B1 | 1/2020 | Dalal et al. |
| 10,649,861 | B1 | 5/2020 | Natanzon et al. |
| 2003/0051109 | A1 | 3/2003 | Cochran |
| 2003/0072263 | A1 | 4/2003 | Peterson |
| 2003/0191743 | A1 | 10/2003 | Brodersen et al. |
| 2006/0047926 | A1 * | 3/2006 | Zheng ................... G06F 3/0631 711/162 |
| 2006/0053261 | A1 | 3/2006 | Prahlad et al. |
| 2006/0075281 | A1 | 4/2006 | Kimmel et al. |
| 2007/0185937 | A1 | 8/2007 | Prahlad et al. |
| 2010/0107158 | A1 | 4/2010 | Chen et al. |
| 2014/0115341 | A1 | 4/2014 | Robertson |
| 2014/0279892 | A1 | 9/2014 | Bourbonnais et al. |
| 2016/0210195 | A1 | 7/2016 | Sinha |
| 2016/0342334 | A1 | 11/2016 | Elisha |
| 2016/0359955 | A1 | 12/2016 | Gill et al. |
| 2017/0060449 | A1 | 3/2017 | Zucca et al. |
| 2017/0131905 | A1 | 5/2017 | Agombar et al. |
| 2017/0193012 | A1 | 7/2017 | Gupta et al. |
| 2017/0262520 | A1 | 9/2017 | Mitkar et al. |
| 2017/0315728 | A1 | 11/2017 | Zheng et al. |
| 2018/0121453 | A1 | 5/2018 | Jain et al. |
| 2018/0143880 | A1 | 5/2018 | Dornemann |
| 2018/0276084 | A1 | 9/2018 | Mitkar et al. |
| 2018/0285214 | A1 | 10/2018 | Ashraf et al. |
| 2019/0340075 | A1 | 11/2019 | Ramachandran et al. |
| 2020/0097376 | A1 | 3/2020 | Zhao et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Microsoft, "Volume Shadow Copy Service", (Sep. 3, 2014), from https://docs.microsoft.com/en-us/previous-versions/windows/it-pro/windows-server-2008-R2-and-2008/ee923636(v=ws.10).

Vmware, "Using Storage vMotion to migrate a virtual machine with many disks timeout (1010045)", (Last Updated Feb. 19, 2014).

Non-Final Office Action dated Jun. 11, 2020 for related U.S. Appl. No. 16/201,258.

Non-Final Office Action dated Feb. 21, 2020 for related U.S. Appl. No. 16/200,470.

Cano, I. et al., "Curator: Self-Managing Storage for Enterprise Clusters", 14th USENIX Symposium on Networked Systems Design and Implementation, NSDI '17, (Mar. 27, 2017).

International Search Report dated Feb. 14, 2019 for corresponding PCT Patent Application No. PCT/US18/62669.

International Preliminary Report dated Jan. 6, 2020 for corresponding PCT Patent Application No. PCT/US18/62669.

Non-Final Office Action dated Aug. 6, 2020 for related U.S. Appl. No. 16/200,482.

Arrieta-Salinas, l., et al., "Classic Replication Techniques on the Cloud", ARES 2012, Prague, Czech Republic, Aug. 20-24, 2012, pp. 268-273.

Yoon, H., et al., "Attribute-Based Partial Gee-Replication System", IC2E 2016, Berlin, Germany, Apr. 4-6, 2016, pp. 127-130.

Non-Final Office Action dated Aug. 11, 2020 for U.S. Appl. No. 16/201,826.

Final Office Action dated Sep. 10, 2020 for related U.S. Appl. No. 16/200,470.

Notice of Allowance dated Nov. 4, 2020 for related U.S. Appl. No. 16/201,258.

Non-Final Office Action dated Jan. 6, 2021 for related U.S. Appl. No. 16/200,470.

Final Office Action dated Jan. 11, 2021 for U.S. Appl. No. 16/201,826.

Final Office Action dated Feb. 16, 2021 for related U.S. Appl. No. 16/200,482.

Advisory Action dated Mar. 19, 2021 for U.S. Appl. No. 16/201,826.

Advisory Action dated Apr. 26, 2021 for U.S. Appl. No. 16/200,482.

Notice of Allowance dated Apr. 15, 2021 for U.S. Appl. No. 16/201,826.

(56) References Cited

OTHER PUBLICATIONS

Notice of Allowance dated Jun. 16, 2021 for U.S. Appl. No. 16/200,482.
Kernighan, Brian W., et al., The C Programming Language, Prentice-Hall Software Series, Prentice-Hall, Inc., Englewood Cliffs, NJ © 1978, pp. 3-4, 11-12, 16-17, 51, 56-60 and 202.
Final Office Action dated Jul. 27, 2021 for related U.S. Appl. No. 16/200,470.

* cited by examiner

FORMING LIGHTWEIGHT SNAPSHOTS FOR LOSSLESS DATA RESTORE OPERATIONS

RELATED APPLICATIONS

The present application claims the benefit of priority to U.S. Patent Application Ser. No. 62/591,090 titled "LOSSLESS DATA RESTORE USING MULTIPLE LEVELS OF LIGHTWEIGHT SNAPSHOTS", filed on Nov. 27, 2017, which is hereby incorporated by reference in its entirety; and the present application claims the benefit of priority to U.S. Patent Application Ser. No. 62/591,098 titled "FORMING LIGHTWEIGHT SNAPSHOTS FOR LOSSLESS DATA RESTORE OPERATIONS", filed on Nov. 27, 2017, which is hereby incorporated by reference in its entirety; and the present application claims the benefit of priority to U.S. Provisional Patent Application Ser. No. 62/591,123 titled "EMULATING HIGH-FREQUENCY SNAPSHOTS BY FORMING RESTORE POINT DATA SETS BASED ON REMOTE SITE REPLAY OF I/O COMMANDS", filed on Nov. 27, 2017, which is hereby incorporated by reference in its entirety; and the present application is related to U.S. patent application Ser. No. 16/200,470 titled "LOSSLESS DATA RESTORE USING MULTIPLE LEVELS OF LIGHTWEIGHT SNAPSHOTS", filed on even date herewith, which is hereby incorporated by reference in its entirety.

FIELD

This disclosure relates to high availability of computer data, and more particularly to techniques for forming lightweight snapshots for lossless data restore operations.

BACKGROUND

In many computing environments, users of the computing systems are averse to losing data. In some situations, loss of data is ameliorated by taking periodic backups of data and storing that data in a safe (e.g., offsite) location such that the data can be restored in the event that all or portions of the computing system suffers a failure such as a disk drive failure, or a multiple disk drive failure event, or any other form of a computing system failure.

As the value of data increases, users are demanding that more and more backups are taken so that in the event of any of the aforementioned computing system failures, data can be restored to a point in time that is "just before" the occurrence of the failure event. For example, a user or administrator of a computing system might specify that, in the event of a computing system failure event, the computing system can be restored to a point in time that is very recent with respect to the failure event. However, making backups (e.g., full backups, incremental backups, checkpoints, etc.) that can be used to restore the computing system incurs a significant storage expense. Worse, inasmuch as many types of users are only satisfied with ever still shorter and shorter periods of potentially lost data, the frequency of backups to be made and saved increases commensurately, thus demanding excessive amounts of storage space to save the ever-increasing number of backups.

As can be seen, the aforementioned techniques pose an unwanted tradeoff between the storage-related expense of making backups at a high frequency and the shortness of the time period during which a system can be restored.

Unfortunately, users do not want to accept this tradeoff. Rather, users continue to demand that their systems can be restored ever more quickly after a failure, while still demanding that storage of backup data does not overwhelm the available storage space of the system. What is needed is a way to be able to satisfy shorter and shorter time-to-restore requirements without incurring the higher and higher costs of performing backups at greater and greater frequencies.

SUMMARY

The present disclosure describes techniques used in systems, methods, and in computer program products for forming lightweight snapshots for lossless data restore operations, which techniques advance the relevant technologies to address technological issues with legacy approaches. More specifically, the present disclosure describes techniques used in systems, methods, and in computer program products for forming and managing multiple levels of lightweight snapshots. Certain embodiments are directed to technological alternatives pertaining to populating lightweight snapshots.

The disclosed embodiments modify and improve over legacy approaches. In particular, the herein-disclosed techniques provide technical solutions that address the technical problems attendant to providing a high performance highly granular restore capability while observing data storage quotas. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high performance computing as well as advances in various technical fields related to distributed storage systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
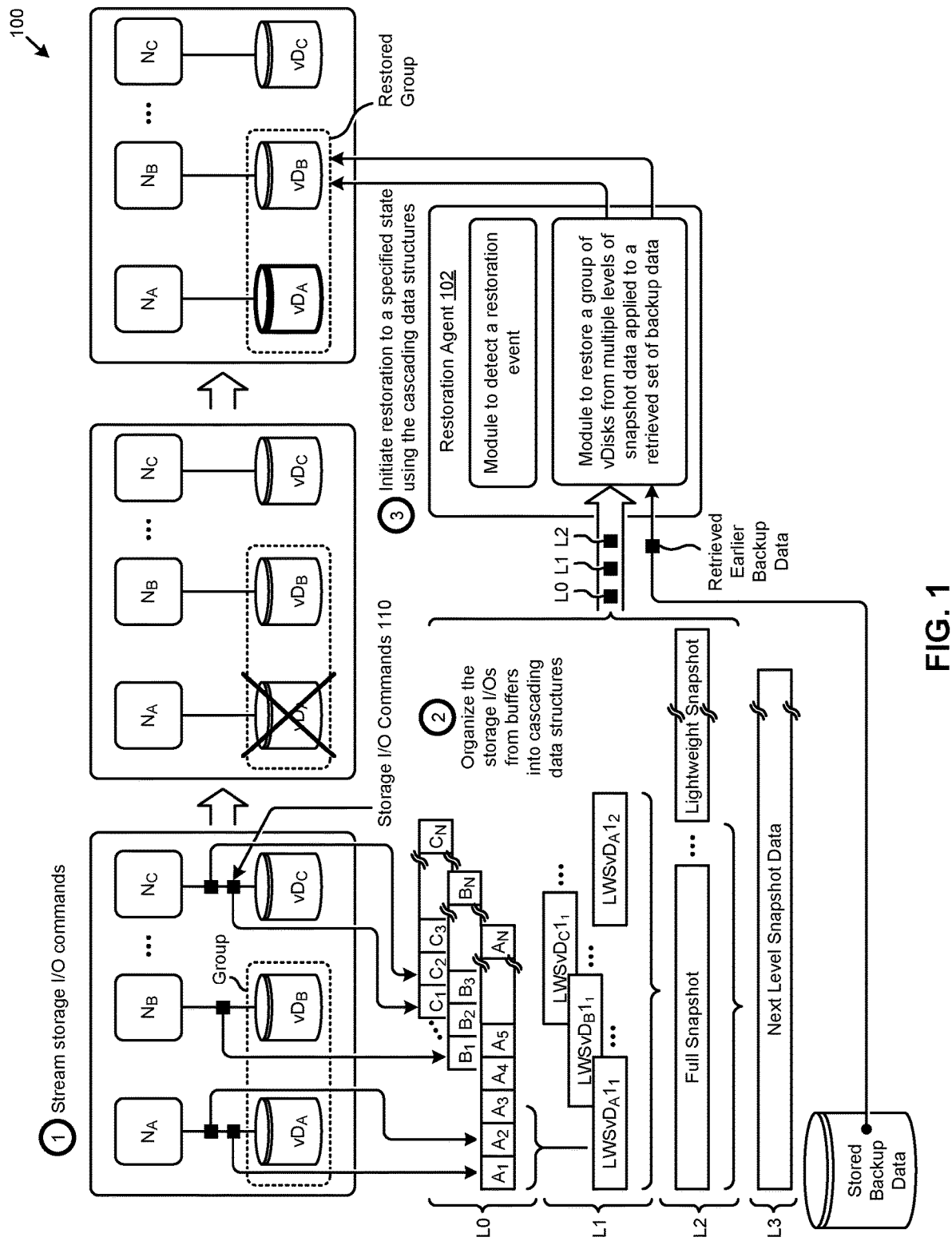
FIG. 1 depicts a data flow showing a technique for a lossless restore of a dataset as implemented using multiple levels of lightweight snapshots, according to an embodiment.

Embodiments in accordance with the present disclosure address the problem of providing a high performance highly granular restore capability while observing data storage quotas. Some embodiments are directed to approaches for forming and managing multiple levels of lightweight snapshots. The accompanying figures and discussions herein present example environments, systems, methods, and computer program products for forming and managing multiple levels of lightweight snapshots.

The disclosed techniques address problems related to demands for excessive amounts of storage space as is required when performing snapshots at a high frequency. When using such a high frequency snapshotting technique, after a failure event, the system can be restored to some state prior to the failure event by applying a series of snapshots. This technique can be implemented to restore the data to a particular point in time or to a particular state, however the implementation of storing/applying demands a huge amount of storage space and a huge amount processing time, which in turn results in a long delay from the time that the restore processing is initiated and the time that the restore processing completes. This problem is addressed by various techniques that are shown and discussed as pertains to the appended figures. Application of the aforementioned techniques results in efficient use of persistent storage device capacities, while also being able to recover data to a very recent moment in time.

Overview

One technique involves managing multiple point-in-time staging areas in a cascade, where data from the highest level in the cascade captures data at the first granularity such as at the granularity of individual storage I/O (input/output or IO) commands (e.g., at the millisecond level of granularity), a next level captures storage I/O at a somewhat lower level of granularity (e.g., at a minute level or hour level of granularity) and a successively next level captures storage I/O at a third or Nth level of granularity (e.g., to cover a working shift period or a daily level of granularity, etc.). Data structures for each particular level of the cascade are sized to be able to capture at least as many storage I/O commands as is predictable for the particular level's granularity with respect to the nature of the makeup and format of the stored I/Os (e.g., which commands, which flags, which formats of the corresponding data or pointers, etc.).

As an example, a first level might be sized to store 10 k storage I/O commands in a buffer and a second level might be sized to store 60 k storage I/O commands in a buffer, and so on. A collection of storage I/O commands forms a lightweight snapshot. As used herein a lightweight snapshot comprises storage I/O commands or pointers to storage I/O commands that can be applied to backup data (e.g., full backups, incremental backups, checkpoints, etc.) that comprise data of a disk or virtual disk. As another example, a first level might be sized to store 10 minutes of storage I/O activity as a lightweight snapshot. A second level might be sized to store one hour of data in a lightweight snapshot, and a third level might be sized to store eight hours of storage I/O commands of data in a lightweight snapshot, and so on, cascading down to a lowest level. Any particular level can subsume any combination of I/O commands, and/or lightweight snapshots, and/or checkpoints, and/or incremental backups, and/or full backups, and/or any other data that corresponds to the time granularity of the particular level. As such, when restoring to a time or state of data (e.g., to a time or state of a disk or to a time or state of a group of disks or to a time or state of virtual disk, etc.) combinations of backup data, incremental data, checkpoints, lightweight snapshots, and I/O commands can be successively applied to reach any desired time or state.

As one particular example, upon a restore event, the most recent previously stored backup, checkpoint or full snapshot can be accessed, and the data changes corresponding to the storage I/O commands of the higher levels are applied successively so as to restore to a particular point in time or state, possibly up to a point in time that corresponds to the moment of the last captured storage IO. Continuing the example of the previous paragraphs, if the most recent previously stored backup, checkpoint or full snapshot comprises data up to midnight last night, and the user wants to restore to 9 am today, then the lightweight snapshot comprising storage I/O commands from the midnight to 8 am time period can be applied to the most recent previously stored backup, checkpoint or full snapshot, followed by application of the lightweight snapshot comprising storage I/O commands from the 8 am to 9 am time period. If the user wants to restore to a still more recent moment, such as until 9:10 am today, then the lightweight snapshot from the 10-minute level corresponding to the 9 am to 9:10 am time period can be accessed and further applied.

The process of cascading includes (1) cascading down to an adjacent lower level (e.g., copying storage I/O commands or pointers to storage I/O commands to a lower level), (2) materializing one or more full snapshots that cover I/O pertaining to the time interval that corresponds to a respective level of granularity, and (3) deleting unneeded portions from the higher level once that data has been cascaded down. Accordingly, since checkpoints are maintained at multiple levels of granularity, rebuild times are reduced relative to legacy techniques. Furthermore, since the cascading operations include deleting previously saved but no longer needed checkpoint data, much less storage space is needed relative to the legacy techniques.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

The appended figures depict systems, data structures and techniques that provide for high performance lossless data recovery while greatly reducing the amount of stored data as is demanded by legacy techniques. This garners significant benefits to users and administrators, at least in that far less computing cycles are needed to restore a dataset while, at the same time, far less storage is needed as compared with previous techniques. The value of this benefit continues to increase as time goes on, at least since, as the value of data increases, users demand that data is to be restored to a point in time that is "just before" the occurrence of a failure event. However, as earlier mentioned, making backups using legacy techniques alone (e.g., using full backups, and/or using incremental backups, etc.) incurs a significant storage expense, which significant storage expense is avoided when using the herein-disclosed lightweight snapshot data structures and corresponding techniques in backup and restore scenarios.

FIG. 1 depicts a data flow 100 showing a technique for a lossless restore of a dataset as implemented using multiple levels of lightweight snapshots. As an option, one or more variations of data flow 100 or any aspect thereof may be implemented in the context of the architecture and functionality of the embodiments described herein. The data flow 100 or any aspect thereof may be implemented in any environment.

The embodiment shown in FIG. 1 is merely one example. The shown data flow captures a stream of storage I/O commands (operation 1). The contents of the storage I/O commands are organized into cascading data structures (operation 2), some of which data structures comprise bounded sets of storage I/O commands and/or pointers to storage I/O commands. After a failure event or other event that would indicate that portions of the data of the system should be restored, a set of restore operations are invoked (operation 3). Specifically, a restoration agent 102 is configured with a module to detect a restoration event.

Such a restoration can cover restoration of a disk drive or a plurality of disk drives, or a sector or track or other portion of a disk drive, or such a restoration can cover restoration of a logical or virtual disk drive (e.g., shown as $vD_A$, $vD_B$, $vD_C$) or a group of any of the foregoing (e.g., group of disks, group of vDisks, group of storage areas, etc.). As shown, the virtual disk drives are associated with respective computing nodes (e.g., node $N_A$, node $N_B$, node $N_C$, etc.), and any of the computing nodes can execute instructions, possibly in the form of applications that produce storage I/O commands 110 to the virtual disks. Such storage I/O commands are organized into one or more buffers, each of which buffer is typed and sized to hold a copy of incoming storage I/O commands or pointers to copies of incoming storage I/O commands.

As shown, the level indicates a level L0 comprises three buffers, one corresponding to vDisk $vD_A$, one corresponding to vDisk $vD_B$, and one corresponding to vDisk $vD_C$. The buffers hold copies of, or references to, the incoming storage I/O commands in a strict time-ordered sequence. The copies of, or references to, the incoming storage I/O commands are formatted and stored in such a manner that they can be replayed so as to apply to previously stored contents of a vDisk. Replaying storage I/O commands over previously stored contents of a vDisk has the effect of restoring the vDisk to the state corresponding to the last replayed I/O command.

Sets of sequential storage I/O commands can be assembled into a lightweight snapshot. As shown, the set of sequential storage I/O commands corresponding to vDisk $vD_A$ are assembled into the lightweight snapshot identified as $LWSvD_A1_1$, where the portion of the identifier "$vD_A$" refers to $vDisk_A$, and where the portion of the identifier "$1_1$" refers to level 1 (shown as L1) and its sequence number in a series. For example, the lightweight snapshot identified as lightweight snapshot $LWSvD_A1_2$ is the second in the series at level L1.

The other buffers of level L0 comprise storage I/O commands that pertain to different vDisks. Data from those buffers are assembled into respective lightweight snapshots at level L1 (e.g., lightweight snapshot $LWSvD_B1_1$, and lightweight snapshot $LWSvD_C1_1$), and so on.

The foregoing describes formation of a first level lightweight snapshot (e.g., level L1) from a set of storage I/O commands. Any number of additional levels can be constructed by processing multiple lightweight snapshots from a previous level and storing the results in a lower level. For example, and as shown as pertaining to the level marked as "L2", a full snapshot is assembled from lightweight snapshot $LWSvD_A1_1$ and from lightweight snapshot $LWSvD_A1_2$. The shown level "L2" also depicts a lightweight snapshot being constructed beginning from the moment that the full snapshot at level "L2" was closed. Any number of additional levels can be constructed such that cascading operations from data from one level higher can be cascaded down to the next level, and so on for any number of levels. The shown example of FIG. 1 depicts one additional level, specifically level L3. Successive levels correspond to successively longer and longer time periods that cover more and more storage I/O commands that had occurred within that level's respective time period.

Upon detection of a failure and/or a subsequent restore event, a module to restore a group of vDisks from multiple levels of lightweight snapshot data applied to the retrieved most recent backup data are invoked. Specifically, a module and/or its agents access a repository of stored backup data to retrieve backup data to which is applied the most recent storage I/O commands as can be retrieved from the multiple levels (e.g., level L2, level L1, and level L0, as shown) of the cascading data structures. In this manner, the data can be restored to achieve the same data state as was captured as of the last processed storage I/O command. More specifically, the levels can be traversed through as many levels as are needed to recover or rebuild specified data up to a specified moment in time (e.g., 9:10 am). Strictly as one example, some backup set (e.g., yesterday's midnight backup set) can be accessed to retrieve data from (for example) vDiskA, after which next level L3 data (e.g., graveyard shift incremental snapshot data) can be accessed and data pertaining to vDiskA can be applied, after which level L2 (e.g., 8 am to 9 am lightweight snapshot data) can be applied, after which level L1 (e.g., lightweight snapshot data for vDisk) can be applied to bring the data state of vDiskA to the same state as was present at 9:10 am.

As such a data state for any particular data item can be recovered to a very fine granularity in time, yet without incurring the extremely high costs of forming and retaining more and more snapshots at higher and higher frequencies as is sometime demanded by users. Moreover, and as earlier indicated, the acts of cascading include deleting previously saved but cascaded (and thus no longer needed) checkpoint data, therefore much less storage space is needed to accomplish even a fine-grained restore.

In some cases, and as shown, groups (e.g., consistency groups) of disks or vDisks or combinations thereof can be formed and codified such that upon a restore event, all constituents of the group are restored atomically. As such, applications that execute different portions of the application on multiple different nodes can specify a consistency group, the individual constituents of which consistency group can be recovered together.

Figure 2:
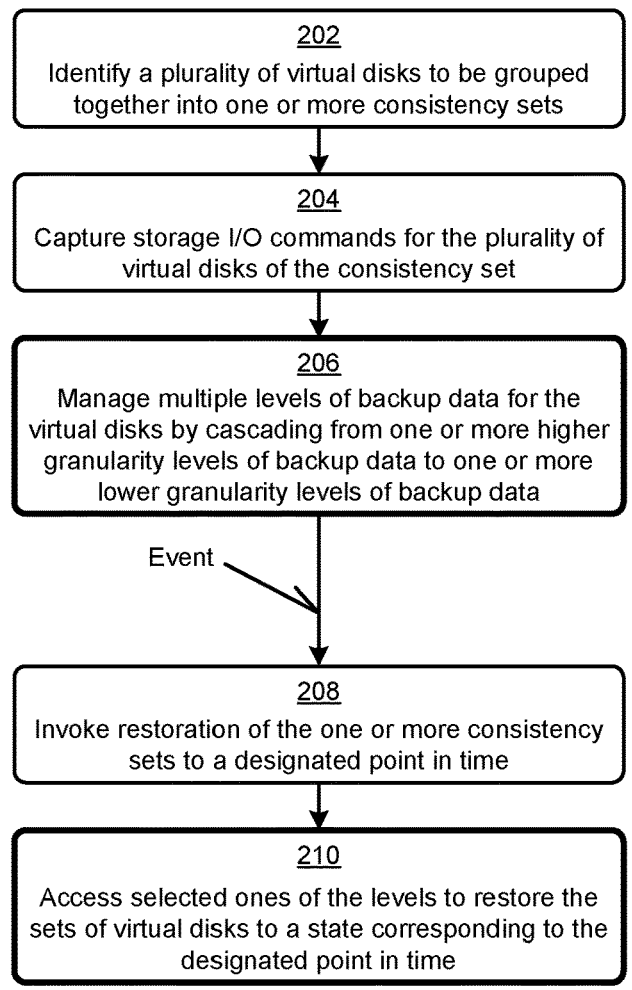
FIG. 2 is a flowchart depicting a restore operation flow that implements techniques for forming and managing multiple levels of lightweight snapshots, according to an embodiment.

FIG. 2 is a flowchart depicting a restore operation flow 200 that implements techniques for forming and managing multiple levels of snapshots. As an option, one or more variations of restore operation flow 200 or any aspect thereof may be implemented in the context of the architecture and functionality of the embodiments described herein. The restore operation flow 200 or any aspect thereof may be implemented in any environment.

The embodiment shown in FIG. 2 is merely one example flow that describes acts from an initial identification of a consistency group of vDisks through to acts for restoring the constituents of the consistency group using multiple levels of checkpoint data. As an example, the restore event specified to restore to the data state corresponding to 9:10 am today, the backup data from last night at 11:59:59 pm is retrieved, and then a checkpoint record corresponding to the lightweight snapshot covering the midnight to 8 am time period can be applied followed by application of a checkpoint record corresponding to storage I/O commands from the 8 am to 9 am time period. If the user wants to restore a still more recent moment, such as until 9:10 am today, then the lightweight snapshot from the 10-minute level corresponding to the 9 am to 9:10 am time period can be accessed and applied as well.

The embodiment shown in FIG. 2 commences at step 202, which step serves to identify a plurality of virtual disks to be grouped together into one or more consistency sets. A sniffer or interceptor or other technique is used to capture storage I/O commands for the plurality of virtual disks of the consistency set (step 204). An operational module is configured to populate storage I/O commands into multiple levels of backup data (e.g., backup datasets, incremental backup sets, checkpoints, lightweight snapshots, and last I/O commands).

The data referred to herein as backup data can be constructed and stored in many different variations. Strictly as examples: A backup dataset might comprise an exact duplicate of all of the "bits" of a particular storage device. Data can literally be copied from the dataset to the same locations as were backed-up and thusly restored. A full snapshot is composed of an ordered series of incremental changes to be applied over earlier backup data to reflect a data state up to the time that the full snapshot was formed. A lightweight snapshot is a group of storage I/O commands and/or pointers to a group of storage I/O commands. The storage commands can be replayed over earlier backup data to reflect a data state up to the time that the last I/O in the lightweight snapshot was captured. Lastly, I/O commands can be captured in an ongoing storage I/O log (e.g., a circular buffer) and captured periodically into a lightweight snapshot that covers the period. As is now understood, when (for example) a set of storage I/O commands are cascaded from a respective ongoing storage I/O log to a lightweight snapshot, when the cascade operations complete, the ongoing storage I/O log can be deleted or reused.

As such, the high-frequency population and deletion or other reuse of storage I/O buffers, together with the cascading of storage I/O commands and/or other backup data through several levels of successively less granular tiers of backup data, serves several objectives: (1) the most recent storage I/O commands are captured, thus permitting recovery to a most recent moment in time, (2) only as much backup data as is needed for a recovery point is retained—out of date backup data (e.g., backup data that is superseded by more recently captured data) can be deleted to reclaim the resources, and (3) the objective of being able to restore rapidly to a very recent point in time is accomplished by maintaining at least some levels of backup data in easy-to-restore structures such as checkpoints, thus reducing the amount of data that would need to be restored by replaying I/Os.

Achievement of the aforementioned objectives is accomplished by cascading through multiple levels of successively less granular tiers of data. Specifically, in the process of cascading, larger numbers of I/Os are subsumed into smaller numbers of lightweight snapshots, and larger numbers of lightweight snapshots are subsumed into smaller numbers of checkpoints, and so on. This serves to reduce the quantity of data that needs to be persisted over time, while still allowing for a rapidly satisfying a restore request to even a fine degree of time-wise granularity.

At some moment in time, possibly, but not necessarily, an event is raised that signals a user's or administrator's demand for restoration of the one or more consistency sets to a user's or administrator's or agent's designated point in time. Step 208 invokes a module or agents, such as the restoration agent 102 of FIG. 1, which in turn accesses selected ones of the levels to restore the sets of virtual disks to a state corresponding to the designated point in time (step 210).

The multi-level backup data management technique of step 206 can have many variations. Some such variations involving staging areas for the backup data are shown and described as pertains to FIG. 3A and FIG. 3B.

Figure 3A:
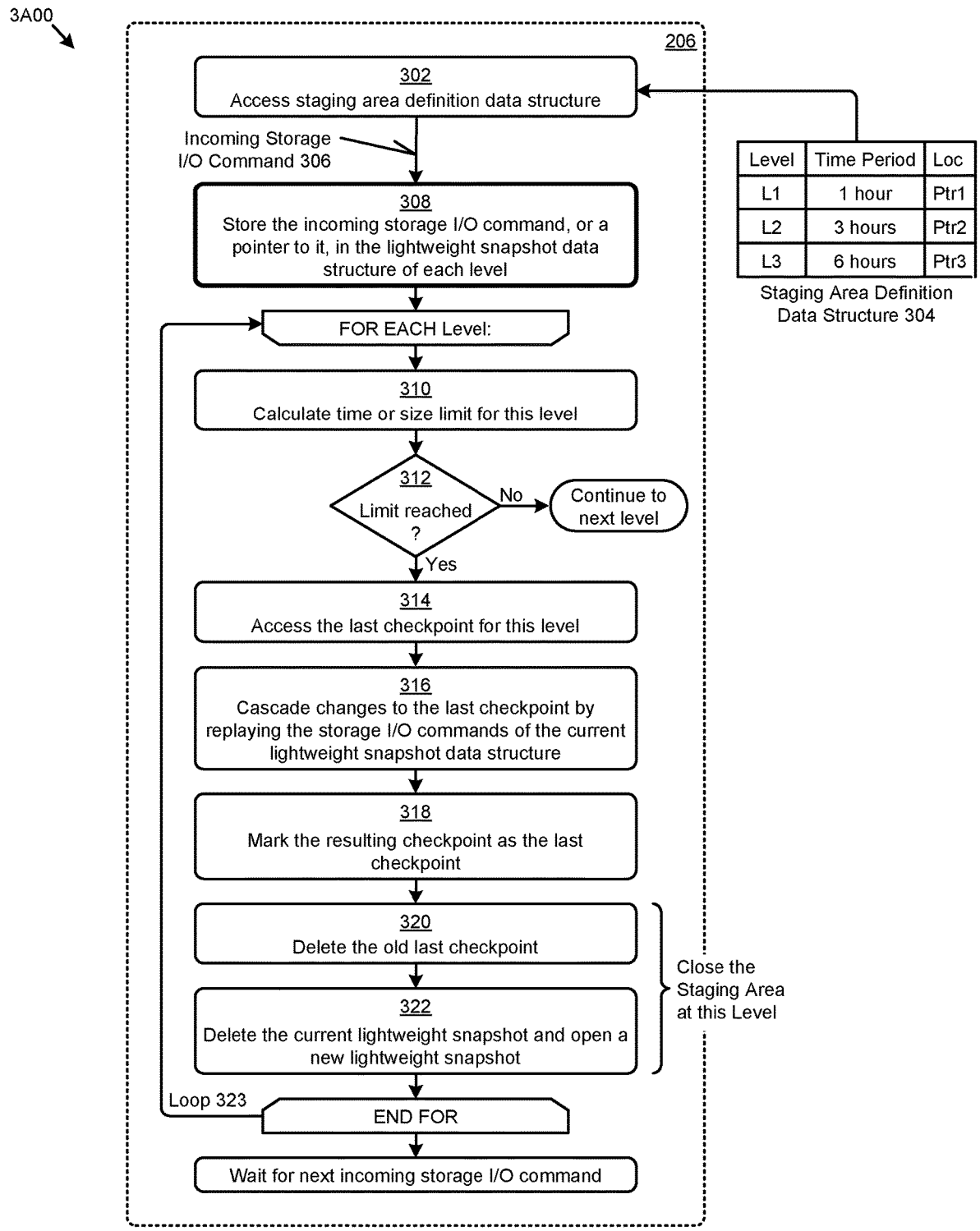
FIG. 3A depicts a staging area management technique as used in systems that employ multiple levels of lightweight snapshots, according to an embodiment.

FIG. 3A depicts a staging area management technique 3A00 as used in systems that employ multiple levels of lightweight snapshots. As an option, one or more variations of staging area management technique 3A00 or any aspect thereof may be implemented in the context of the architecture and functionality of the embodiments described herein. The staging area management technique 3A00 or any aspect thereof may be implemented in any environment.

The embodiment shown in FIG. 3A commences at step 302 by accessing a staging area definition data structure 304. Based at least in part on the contents of the staging area definition data structure, multiple levels of backup data are allocated (e.g., in RAM memory, or in SSD memory, or both). The locations of the allocated levels are stored, possibly in the staging area definition data structure. Using the locations (e.g., device name and offsets or other pointers) staging area data structures in the multiple levels can be accessed. One possible example configuration of various levels of a staging area is given in Table 1.

that level is calculated. In some cases, a time or size limit is expressed in terms of a wall-clock time. In other cases, the time or size limit is expressed in terms of a number of storage I/O commands that can be stored. In still other cases the time or size limit is expressed in terms of a size of a buffer (e.g., number of bytes or number of megabytes or number of gigabytes, etc.) that is used to hold the stored I/Os at a particular level. If, at decision 312, the limit has not yet been reached, then the storage of the incoming storage I/O command 306 completes processing at this level, and the processing continues to the next level.

If however, at decision 312, it has been determined that the limit has been reached, then following the "Yes" branch of decision 312, additional steps to cascade the data are carried out. Specifically, at step 314, the last checkpoint for this level is accessed in preparation for replay. Then, at step 316, each of the storage I/O commands that had been captured in the lightweight snapshot that corresponds to the prior time period of this level is replayed onto the last checkpoint that was accessed in step 314. The resulting new checkpoint is marked (at step 318) as a new "last" checkpoint for this level. This staging area is then ready to be closed. Closing a staging area involves clean-up of data structures, possibly including releasing previously allocated structures and/or possibly adjusting pointers such as might be used in circular buffers. In the specific embodiment shown, step 320 serves to delete the 'old' last checkpoint, and step 322 serves to delete the lightweight snapshot and/or initialize/re-initialize it. When all levels have been processed in the FOR EACH loop (e.g., all levels that are defined in staging area definition data structure 304), then processing of the staging area is complete for this incoming I/O and the routine enters a state to wait for a next incoming storage I/O command. In this manner, such as via progression from the aforementioned step 310 to step 322, staging

TABLE 1

Example staging area level definitions

| Level | Contents | Time Period |
|---|---|---|
| Level0 | Storage I/O commands or pointer to storage I/O commands | 10 minutes of the most recent I/O over the corresponding vDisk |
| Level1 | Lightweight snapshot data bounding a group of storage I/O commands over a first time period | 60 minutes of the most recent storage I/O |
| Level2 | Lightweight snapshot data bounding a group of storage I/O commands over a second (longer) time period | 8 hours of the most recent storage I/O captured |
| Level3 | Full snapshot that comprises a reference to a previous backup, plus an ordered series of incremental changes to be applied over the backup to reflect a data state | One day of the most recent storage I/O captured |
| LevelN | Full backup data comprising a complete state of a real or virtual storage device, including all data and metadata | Backup data is saved daily or at multi-day intervals |

Cascading can occur at any or all of the time periods. In some cases, a shorter time period might coincide with a longer time period. For example, the end of each three-hour time period might coincide with the end of every third one-hour time period, and so on.

When a storage I/O command is detected (e.g., via a sniffer or interceptor or other technique used to capture storage I/O commands) the command is stored as an incoming storage I/O command 306. Specifically, the incoming storage I/O command is captured in one or more levels of the staging area (step 308), for example by making a copy of the incoming storage I/O command, or by referring to a copy that is stored in another location. Then, for each level (e.g., at each iteration through step 310), a time or size limit for areas are maintained over time while avoiding incurring the extremely high costs of retaining large amounts of snapshot data.

In this and other embodiments, the aforementioned checkpoints are data structures or files that comprise data that was changed during a particular period of time. More specifically, a checkpoint is a data structure or file that can be processed over a previous backup set to advance the state of the backed-up items up through the time period covered by the checkpoint. For example, if a backup set covering the state of backed-up items up to midnight last night exists, and if a "graveyard shift" checkpoint exists covering the time period from midnight last night to 8 am today, then a "graveyard shift" checkpoint can be applied to the backup set to restore the backed-up items to a state corresponding to 8 am today.

A checkpoint can be closed at any point in time. Closing a checkpoint has the effect of capturing and organizing data into the checkpoint such that the checkpoint can processed in much less time than as would be required to process a corresponding set of storage I/O commands. Multiple checkpoints can be processed in sequence. Checkpoints are marked with metadata such that the acts of processing a checkpoint file can be idempotent. As an example, if a "graveyard shift" checkpoint covering midnight to 8 am is processed to form a restore set covering the time period through 8 am, and then a checkpoint that covers the time period 6 am through 8 am can be processed over that same restore set without corrupting the restore set. As such, successively smaller checkpoints can be applied to a backup set to form a restore set that is current as of the latest ending time of a checkpoint. If the user wants to restore to a still more recent moment in time for which there is no checkpoint in existence (e.g., such as up until 9:10 am today), then a lightweight snapshot corresponding to the time period of 8 am to 9:10 am can be accessed and further applied.

In most cases, processing through loop 323 proceeds asynchronously with the rate of incoming I/O commands. Accordingly, the sniffer or interceptor or other storage I/O capture module that is used to capture storage I/O commands comprises a memory buffer from which buffer the sequentially next storage I/O command can be served at the consumption and processing rate of the staging area management flow.

Figure 3B:
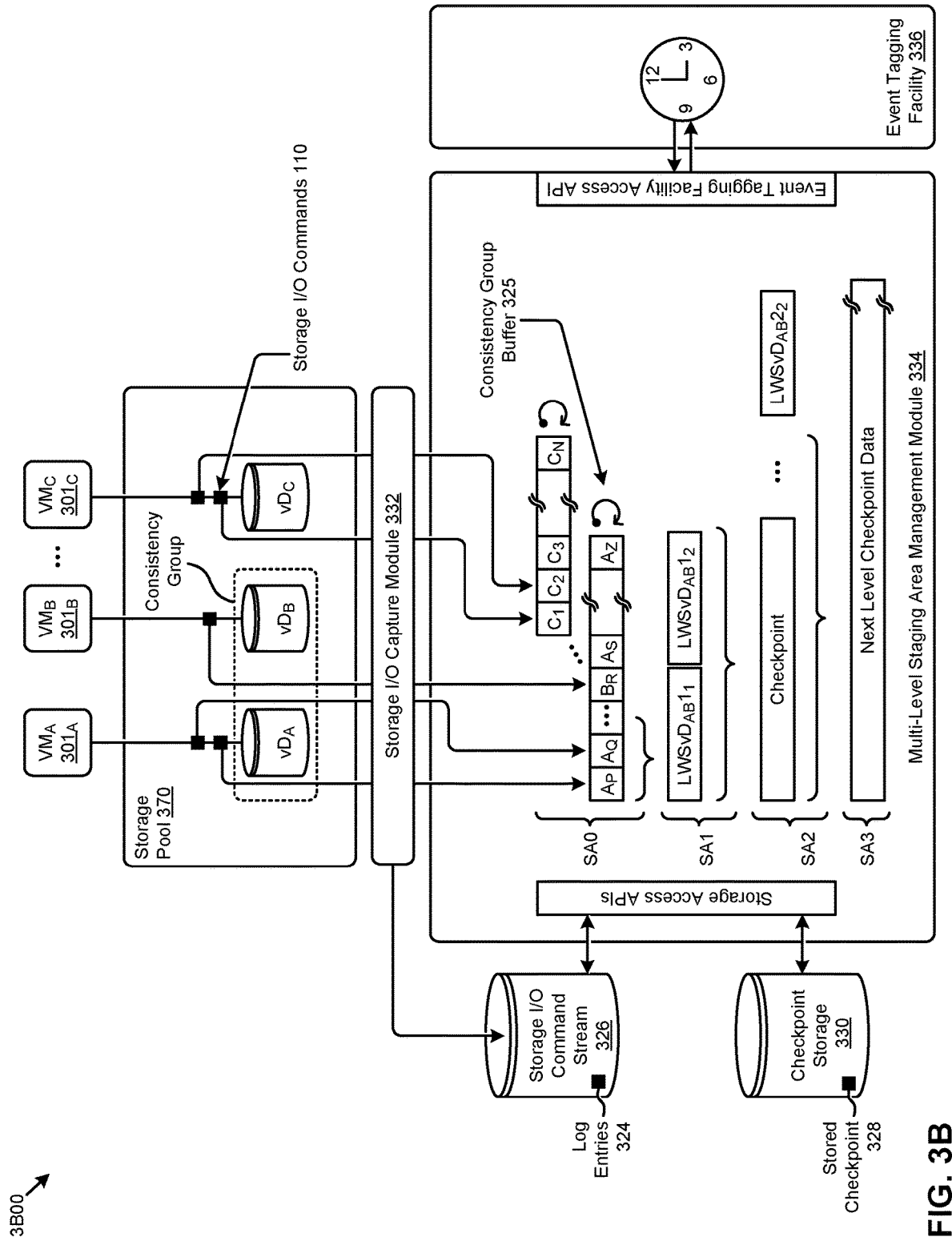
FIG. 3B is a block diagram showing a staging area management environment having a multi-level staging area management module, according to an embodiment.

FIG. 3B is a block diagram showing a staging area management environment 3B00 having a multi-level staging area management module. As an option, one or more variations of a staging area management module or any aspect of the shown environment may be implemented in the context of the architecture and functionality of the embodiments described herein.

The environment and embodiment of the multi-level staging area management module 334 shown in FIG. 3B is merely one example. As shown, a storage I/O capture module 332 serves to receive and buffer the storage I/O commands 110 that are produced by virtual machines (e.g., $VM_A$ $301_A$, $VM_B$ $301_B$, $VM_C$ $301_C$) as they write to virtual disk $vD_A$, virtual disk $vD_B$, and virtual disk $vD_C$ at storage pool 370. In addition to capturing incoming occurrences of storage I/O commands 110 at the consumption and processing rate of multi-level staging area management module 334, the shown storage I/O capture module 332 stores the incoming storage I/O commands as log entries 324 in a storage I/O command stream 326.

In some cases, and as shown, a single buffer (e.g., the shown data structure at staging area level SA0) can hold storage I/O commands for all constituents of a consistency group. In the example consistency group comprising vDisk $vD_A$ and vDisk $vD_B$, any storage I/O commands to vDisk $vD_A$ and/or vDisk $vD_B$ are stored in a sequence in a consistency group buffer 325. Specifically, incoming storage I/O commands are saved into the consistency group buffer in a strict monotonically-increasing sequence regardless of the origin of the storage I/O commands. In the example, the consistency group buffer stores a storage I/O command to write $A_P$, followed by storage write $A_Q$, followed by storage write BR followed by storage write $A_S$, followed by storage write $A_Z$. These entries are processed in the same monotonically-increasing order as were given in the monotonically-increasing sequence of issue. In this example, the 'head' of the buffer is on the left (e.g., referring to a lower memory index), however in other embodiments, such as the embodiment of FIG. 4A, the 'head' of the buffer is on the right (e.g., referring to a higher memory index). The specific choice might depend on the organization of the data structure that is allocated to hold buffered storage I/O commands and lightweight snapshots.

At various moments in time, multi-level staging area management module 334 cascades data from each staging area level down to a next lower staging area level (e.g., from staging area SA1 down to staging area SA2, and from staging area SA2 down to staging area SA3, and so on). In doing so, multi-level staging area management module 334 accesses checkpoint storage 330 to retrieve a stored checkpoint 328. Checkpoint storage 330 might be an area of persistent data storage such as a hard disk drive or such as a solid state storage drive. Alternatively, the checkpoint storage 330 might be an area of volatile memory such as an area of RAM. In any such cases, checkpoint storage can be read from and written to using the shown storage access application programming interfaces (APIs).

As aforementioned, at various moments in time, multi-level staging area management module 334 cascades data from one level to another level. Such various moments in time might be based at least in part on staging area definition data structure 304 of FIG. 3A and/or might be based at least in part on a time or sequence number received from an event tagging facility 336. As a specific example, if the time period covered by level L1 is 1 hour, then the multi-level staging area management module can interface with an instance of the event tagging facility so as to be notified when the 1 hour-long time period has expired. Alternatively, some embodiments rely on a sequence identification rather than a wall clock time and, in such cases, the event tagging facility can be consulted periodically or can be programmed to notify the multi-level staging area management module when a time-based period or sequence number period has expired or is about to expire. Programming or consultation of an event tagging facility can be accomplished by the multi-level staging area management module or its agents.

Returning to the discussion of storage I/O capture module 332, the aforementioned log entries 324 can be referred to from data structures that form a lightweight snapshot. Several variants for construction of and population of lightweight snapshot data structures are given in the following FIG. 4A and FIG. 4B.

Figure 4A:
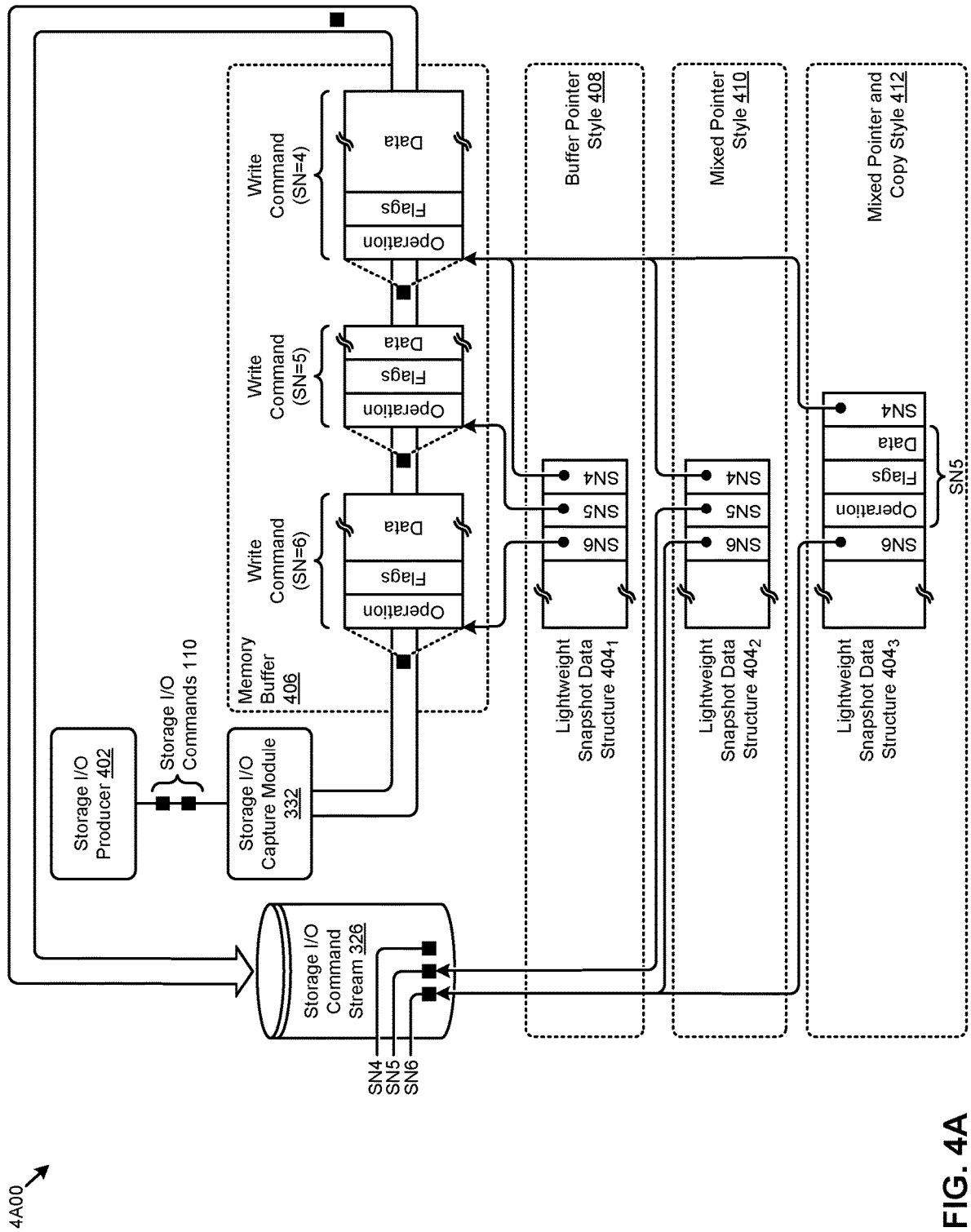
FIG. 4A depicts several lightweight snapshot dataset construction alternatives as used in systems that employ multiple levels of lightweight snapshots, according to an embodiment.

FIG. 4A depicts several lightweight snapshot dataset construction alternatives 4A00 as used in systems that employ multiple levels of lightweight snapshots. As an option, one or more variations of lightweight snapshot dataset construction alternatives 4A00 or any aspect thereof may be implemented in the context of the architecture and functionality of the embodiments described herein. The lightweight snapshot dataset construction alternatives 4A00 or any aspect thereof may be implemented in any environment.

The embodiment shown in FIG. 4A is merely one example. The shown lightweight snapshot dataset construction alternatives include a buffer pointer style 408 (e.g., lightweight snapshot data structure $404_1$), a mixed pointer style 410 (e.g., lightweight snapshot data structure $404_2$), and a mixed pointer and copy style 412 (e.g., lightweight snapshot data structure $404_3$).

As shown, the example lightweight snapshot data structure $404_1$ comprises pointers to entries in memory buffer 406. The entries in memory buffer 406 might comprise data that describes all aspects of a storage I/O command. In the example shown, the write command at sequence number "SN=6" comprises an operation, any number of flags, and data. The data may be relatively larger or may be relatively smaller as depicted by the relative size of the data field of the shown write command at sequence number "SN=5", or as compared to the relative size of the data field of the shown write command at sequence number "SN=4".

A lightweight snapshot data structure is populated with pointers and/or copies to locations of storage I/O commands 110. The actual location of the storage I/O commands that are pointed to by the lightweight snapshot data structure might be in volatile storage of a memory buffer 406 or might be in persisted non-volatile storage of a storage I/O command stream 326 (e.g., the shown write command SN4, write command SN5, and write command SN6).

Population of a lightweight snapshot data structure $404_2$ in the style of the mixed pointer style 410 includes pointers to memory locations of the memory buffer 406 as well as pointers or other forms of location identifiers that serve for access to the persisted data of the non-volatile storage of a storage I/O command stream 326. In some cases, location identifiers to the persisted data of the non-volatile storage of a storage I/O command stream 326 might be by a name of a table and/or and or by a name of a table and a key value that is used to access a particular location in the table.

Population of a lightweight snapshot data structure $404_3$ in the style of the mixed pointer and copy style 412 includes copies of a storage I/O commands together with pointers to memory locations of the memory buffer 406 and/or pointers or other forms of location identifiers that serve to access the persisted data of the non-volatile storage of a storage I/O command stream 326. In the shown example of the mixed pointer and copy style 412, the write command SN5 is stored in the lightweight snapshot data structure as a copy of write command SN5.

In the depiction of FIG. 4A, storage I/O commands are produced by storage I/O producer 402. Such production might originate from a virtual machine writing to a virtual disk, or such production might originate from any computing process or thread writing to any device that can receive storage I/O commands. As shown, storage I/O commands produced by the storage I/O producer are delivered to the storage I/O capture module 332, which in turn forwards the command to a memory buffer, and possibly also to the storage I/O command stream. Determination of what style to use during population of a particular lightweight snapshot data structure can be performed programmatically, as is shown and discussed in FIG. 4B.

Figure 4B:
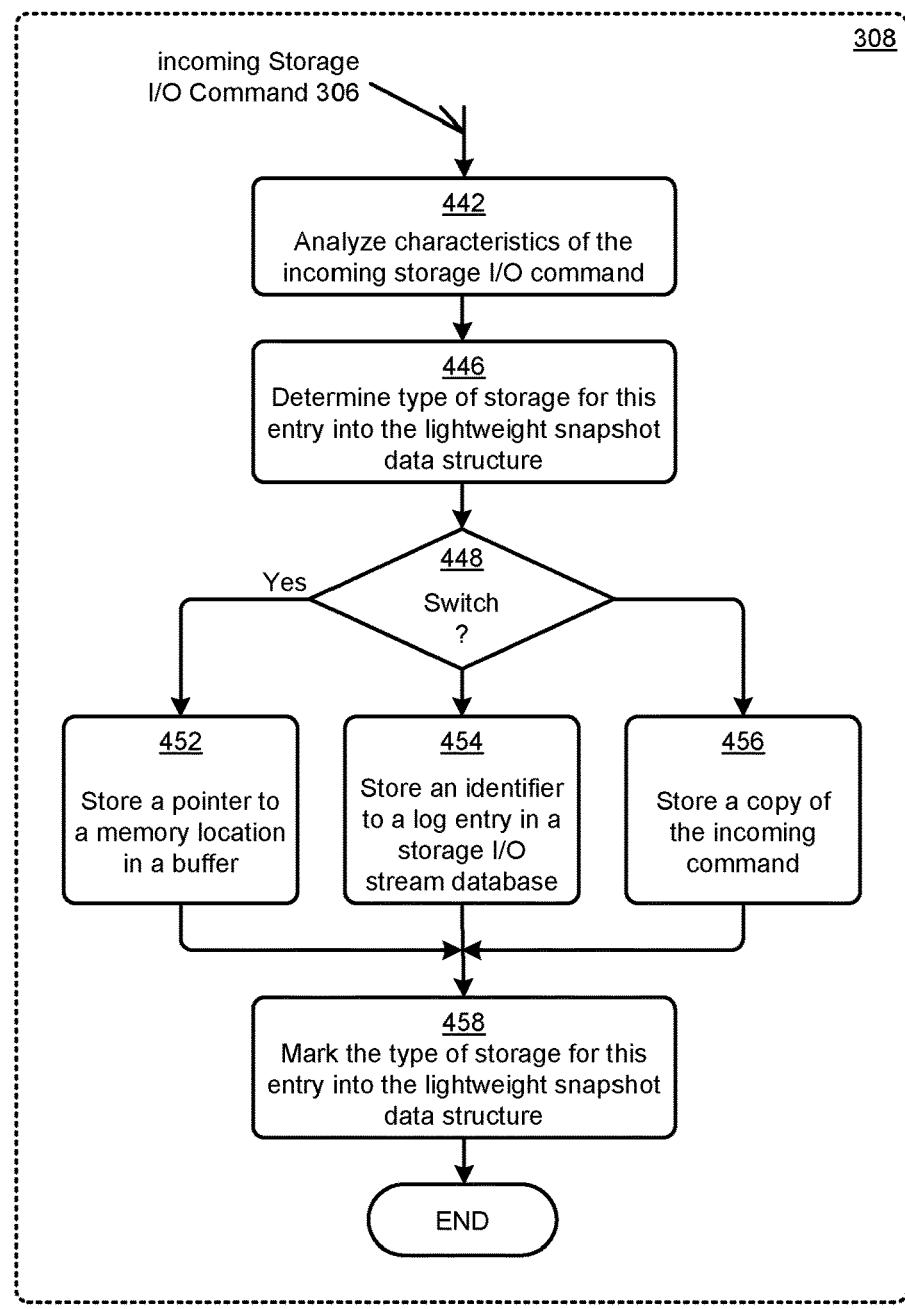
FIG. 4B depicts a lightweight snapshot population technique as used in systems that employ multiple levels of lightweight snapshots, according to an embodiment.

FIG. 4B depicts a lightweight snapshot population technique 4B00 as used in systems that employ multiple levels of lightweight snapshots. As an option, one or more variations of lightweight snapshot population technique 4B00 or any aspect thereof may be implemented in the context of the architecture and functionality of the embodiments described herein. The lightweight snapshot population technique 4B00 or any aspect thereof may be implemented in any environment.

The embodiment shown in FIG. 4B depict merely one example of a processing flow to make a determination as to what style to use during population of a lightweight snapshot data structure. The processing includes a determination step 446 and a switch 448 that selects from among several types of storage options for populating the lightweight snapshot data structure.

As shown, upon receipt of an incoming storage I/O command 306, step 442 is entered, which step serves to analyze characteristics of the received I/O command. In some cases, one or more characteristics can be dispositive as to the style to be used. For example, if the incoming storage I/O command 306 comprises a large amount of data (e.g., megabytes of data), that particular command might be entered into the lightweight snapshot data structure in accordance with the processing of step 454 such that, rather than store a pointer to a memory location (as per step 452), and rather than store a copy of the incoming storage I/O command (as per step 456), the lightweight snapshot data structure is populated with an identifier to a log entry (e.g., an individual one of the log entries 324 of FIG. 3B) in a database that forms a storage I/O command stream 326). In some cases, the type of entry is marked (at step 458), possibly as a value stored in the lightweight snapshot data structure. In other cases, the type of storage of the entry is implied or inherent in the entry itself. As such, the foregoing operations of step 442 through step 458 serve for analyzing characteristics of an incoming one of the plurality of storage I/O commands so as to determine a type of storage of a corresponding lightweight snapshot entry. Different types of storage to form particular lightweight snapshot entries can be used in a single lightweight snapshot data structure (e.g., as in the mixed pointer style 410 and mixed pointer and copy style 412 of memory buffers as depicted in FIG. 4A).

FIG. 5A through FIG. 5H depict staging area contents 500 as used in systems that employ multiple levels of lightweight snapshots. As an option, one or more variations of staging area contents or any aspect thereof may be implemented in the context of the architecture and functionality of the embodiments described herein.

The figures depict merely one example of how values are entered and deleted from a lightweight snapshot data structure.

Figure 5A:
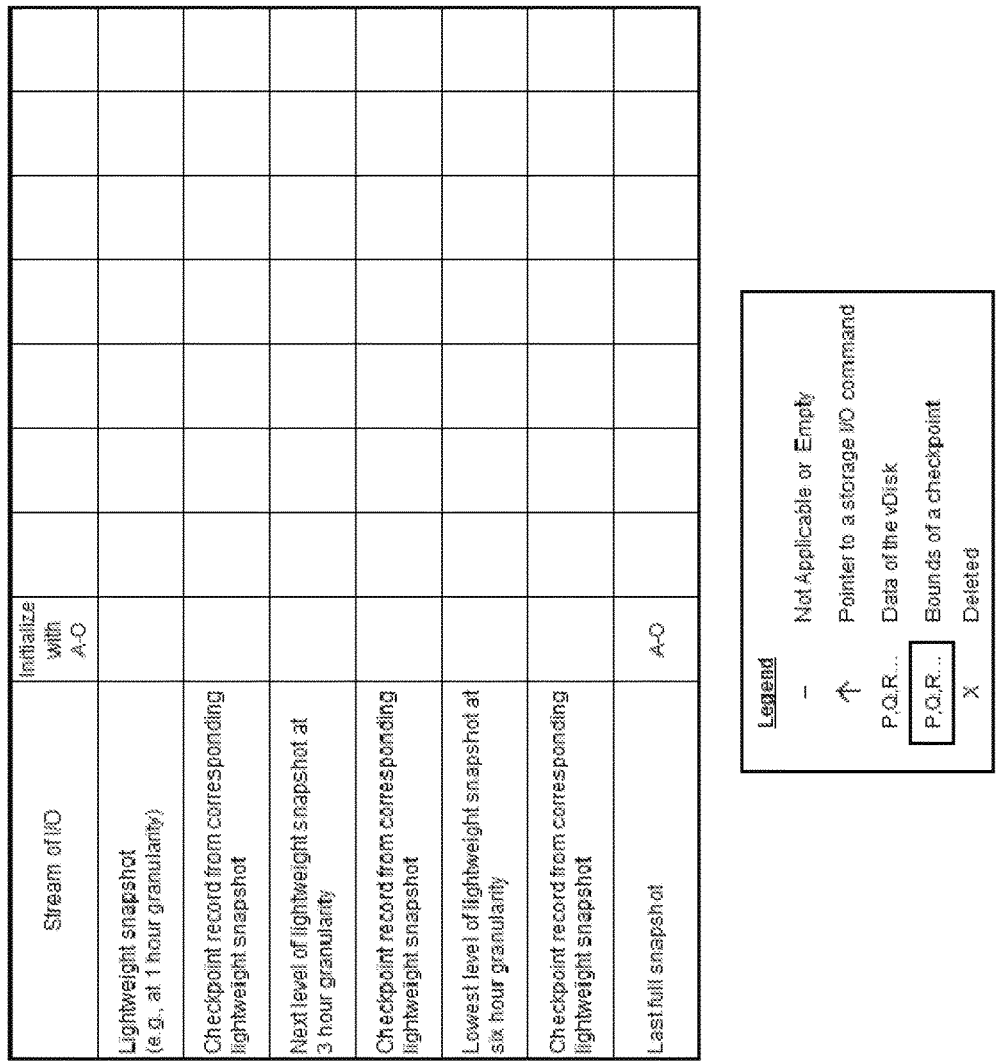
FIG. 5A, FIG. 5B, FIG. 5C, FIG. 5D, FIG. 5E, FIG. 5F, FIG. 5G, and FIG. 5H depict staging area contents as used in systems that employ multiple levels of lightweight snapshots, according to an embodiment.

FIG. 5A depicts an initial state where a storage area comprises data corresponding to "A-O". at the moment in time corresponding to this initial state, the storage area comprises data corresponding to "A-O" and also the last full snapshot comprises data so as to be able to rebuild the subject storage area, possibly using a combination of a full backup and incremental records to a state corresponding to "A-O".

Figure 5B:
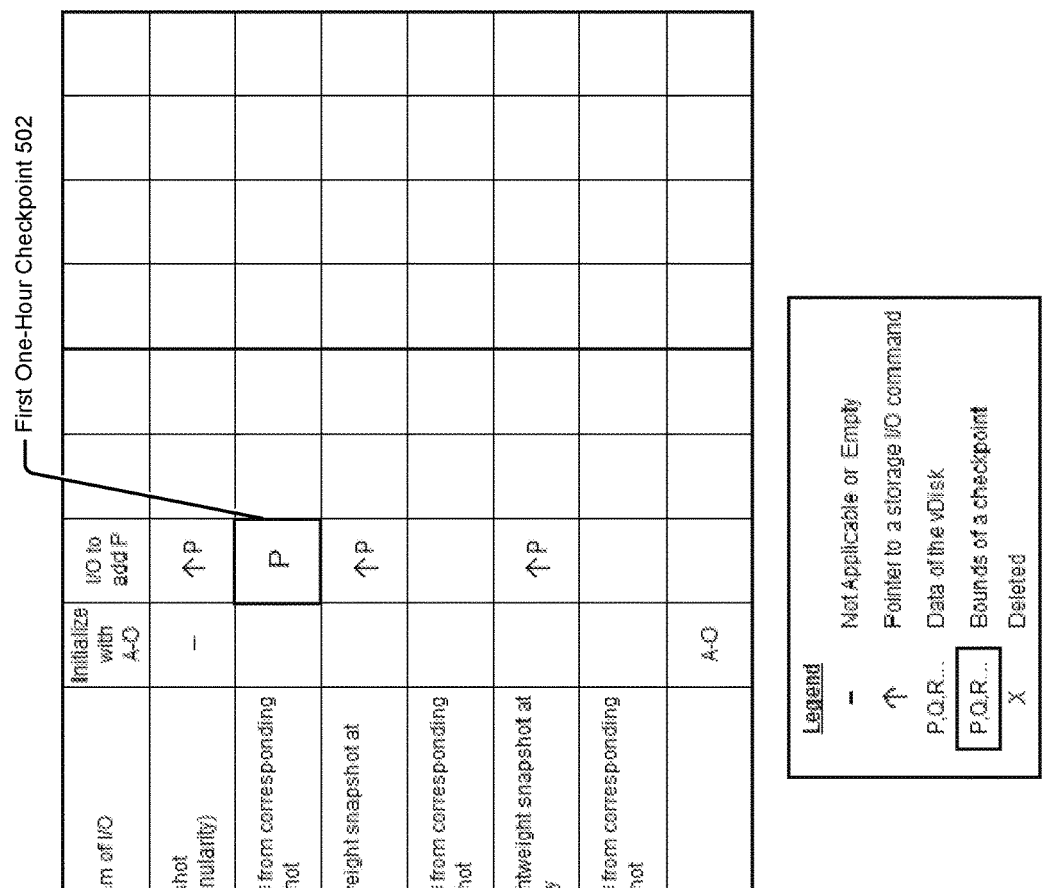

FIG. 5B depicts a subsequent moment in time when a storage I/O command adds "P" to the subject storage area. At that moment in time, steps in accordance with the flow of FIG. 3A are performed. Specifically, and as shown, a pointer to the storage I/O command "I/O to add P" is entered into the next sequential location of each lightweight snapshot data structure of each level. In this example, the moment in time when the storage I/O command adds "P" to the subject storage area occurs just before or coincides with the time limit of the first level (e.g., the one-hour granularity level). As such, the first one-hour checkpoint 502 for this first level is updated with any I/O that had not yet been applied to the checkpoint record for this level, thus generating a checkpoint record for the first one-hour time period. This checkpoint record is denoted by the letter "P", indicating that "P" had been added to the storage area. The lightweight snapshots for the other levels are also populated with the incoming storage I/O for "P". The other levels have expiry periods longer than 1 hour, so they do not cascade at this first one hour expiry.

Figure 5C:
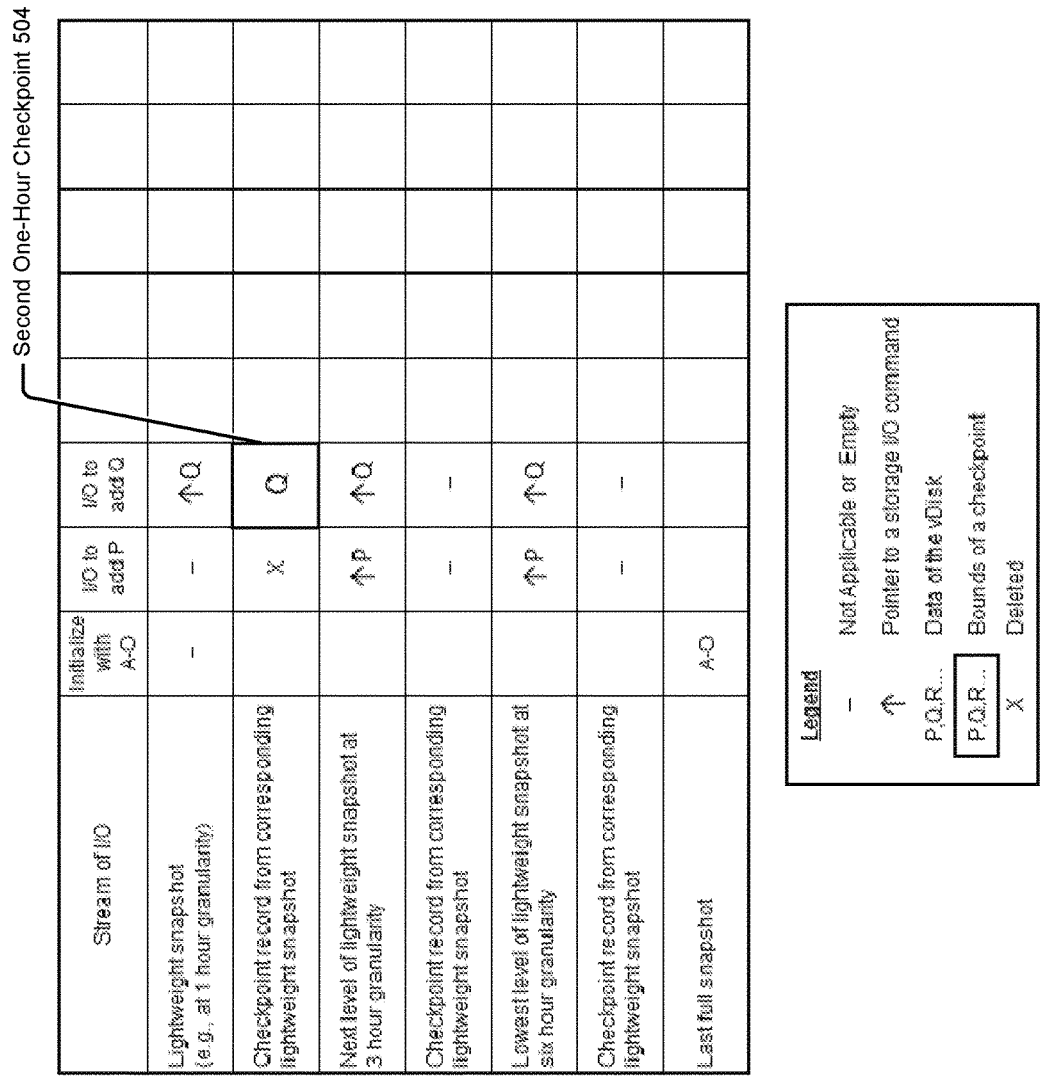

FIG. 5C depicts the data structures at the expiry of the second one hour time period. The storage I/O command for "I/O to add Q" is added to all lightweight snapshots at all levels. Continuing this example, the moment in time when the storage I/O command that adds "Q" to the subject storage area occurs just before or coincides with the second time limit expiry of the first level (e.g., at 2 hours). As such, the second one-hour checkpoint 504 for this first level is updated with any I/O that had not yet been applied to the checkpoint record for this level, thus generating a checkpoint record for the second one-hour time period which, as is shown, includes application of the storage I/O to "add Q". The other levels have expiry periods longer than 2 hours, so they do not cascade yet.

Figure 5D:
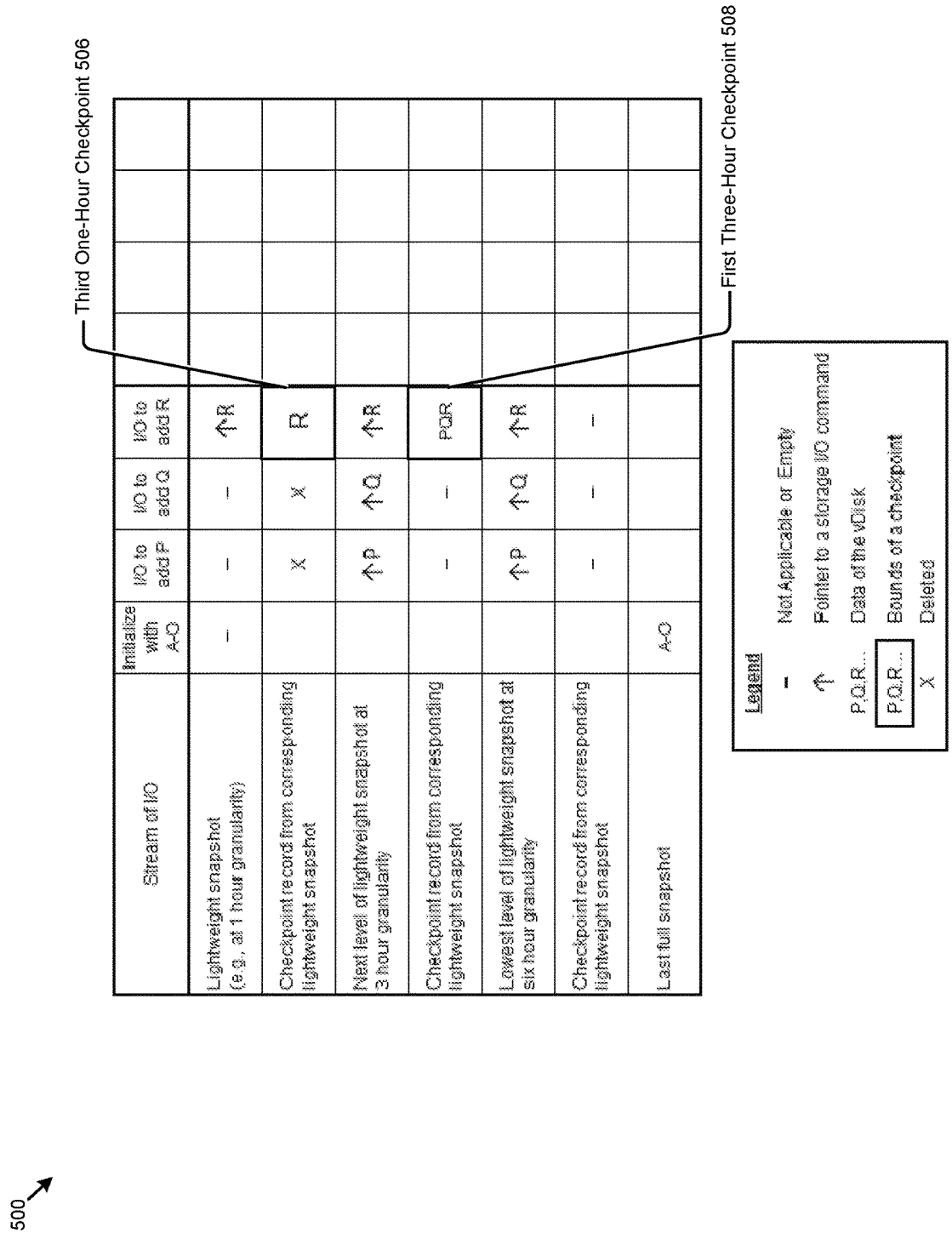

FIG. 5D depicts the data structures at the expiry of the third one-hour time period. The storage I/O for "add R" is added to all lightweight snapshots at all levels.

The expiry of the third one-hour time period is coincident with the expiry of the three-hour granularity level. As such, processing to occur at the expiry of the three-hour granularity level is undertaken as well as processing to occur at the expiry of the third one-hour time period. This is shown in FIG. 5D. Specifically, processing to occur at the expiry of the third one-hour time period includes formation of the third one-hour checkpoint 506, and also processing to occur at the expiry of the three-hour time period includes formation of the first three-hour checkpoint 508.

Figure 5E:
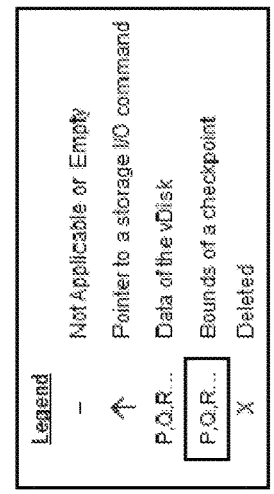

FIG. 5E depicts the data structures at the expiry of the fourth one-hour time period. Since the fourth hour marks expiry of only the one-hour granularity level, only one checkpoint record is generated, namely the fourth one-hour checkpoint 510 that includes the result of performing the "I/O to add S".

Figure 5F:
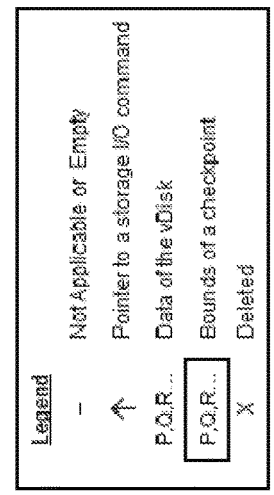

FIG. 5F depicts the data structures at the expiry of the fifth one-hour time period. Since the fifth hour marks expiry of only the one-hour granularity level, only one checkpoint record is generated, namely the fifth one-hour checkpoint 512.

Figure 5G:
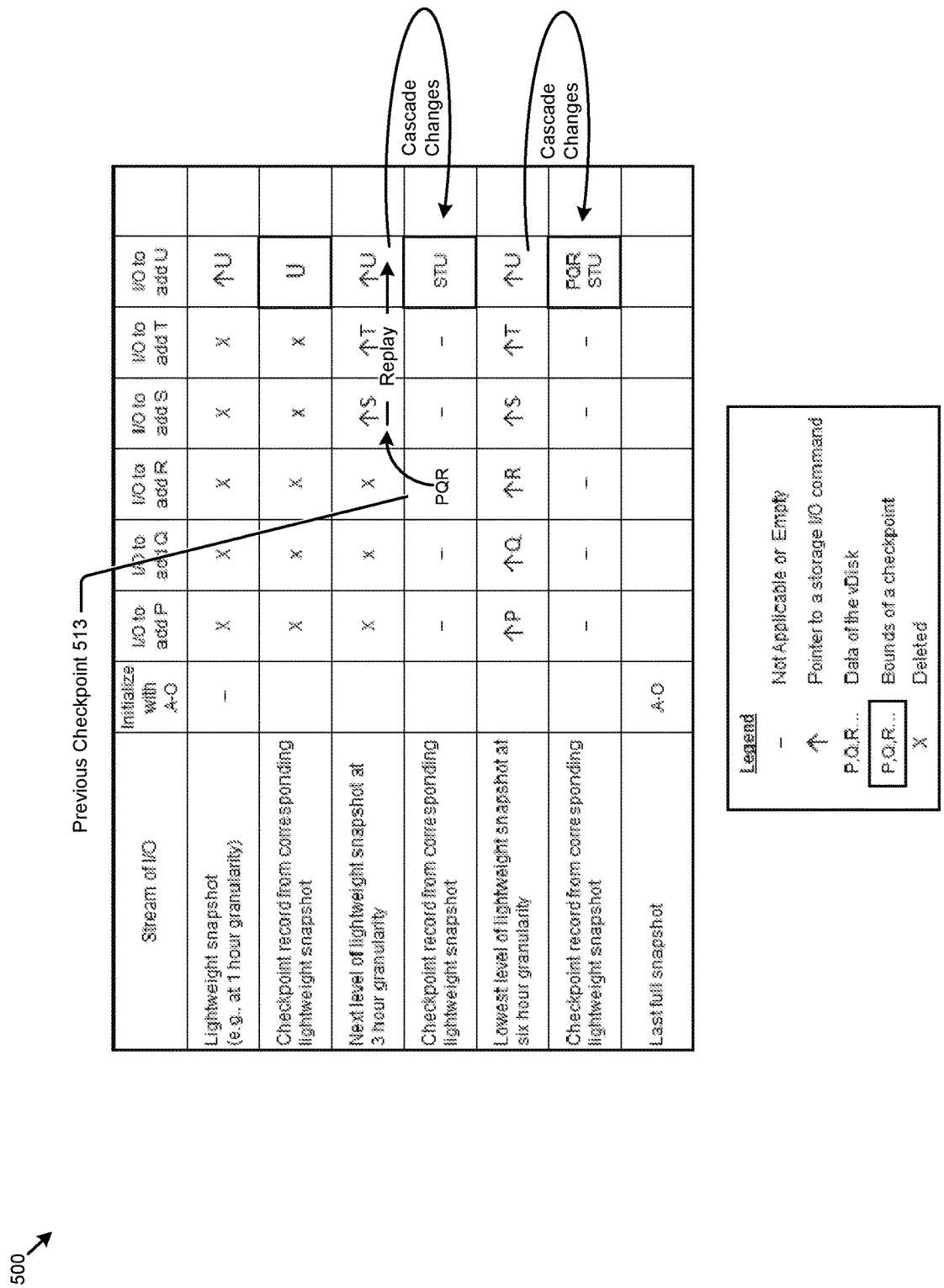

FIG. 5G depicts the data structures at the expiry of the sixth one-hour time period, which expiry coincides with the expiry of the one-hour granularity level as well as the expiry of the three-hour granularity level as well as the expiry of the six-hour granularity level. When processing the three-hour granularity level, the last checkpoint from this level (e.g., the shown previous checkpoint 513) is accessed and changes that are in that level's lightweight snapshot are replayed over the previous checkpoint, resulting in a new checkpoint denoted by "STU". At that point, since the shown previous checkpoint 513 is no longer needed, and since the lightweight snapshot of that level is no longer needed, both can be deleted.

Figure 5H:
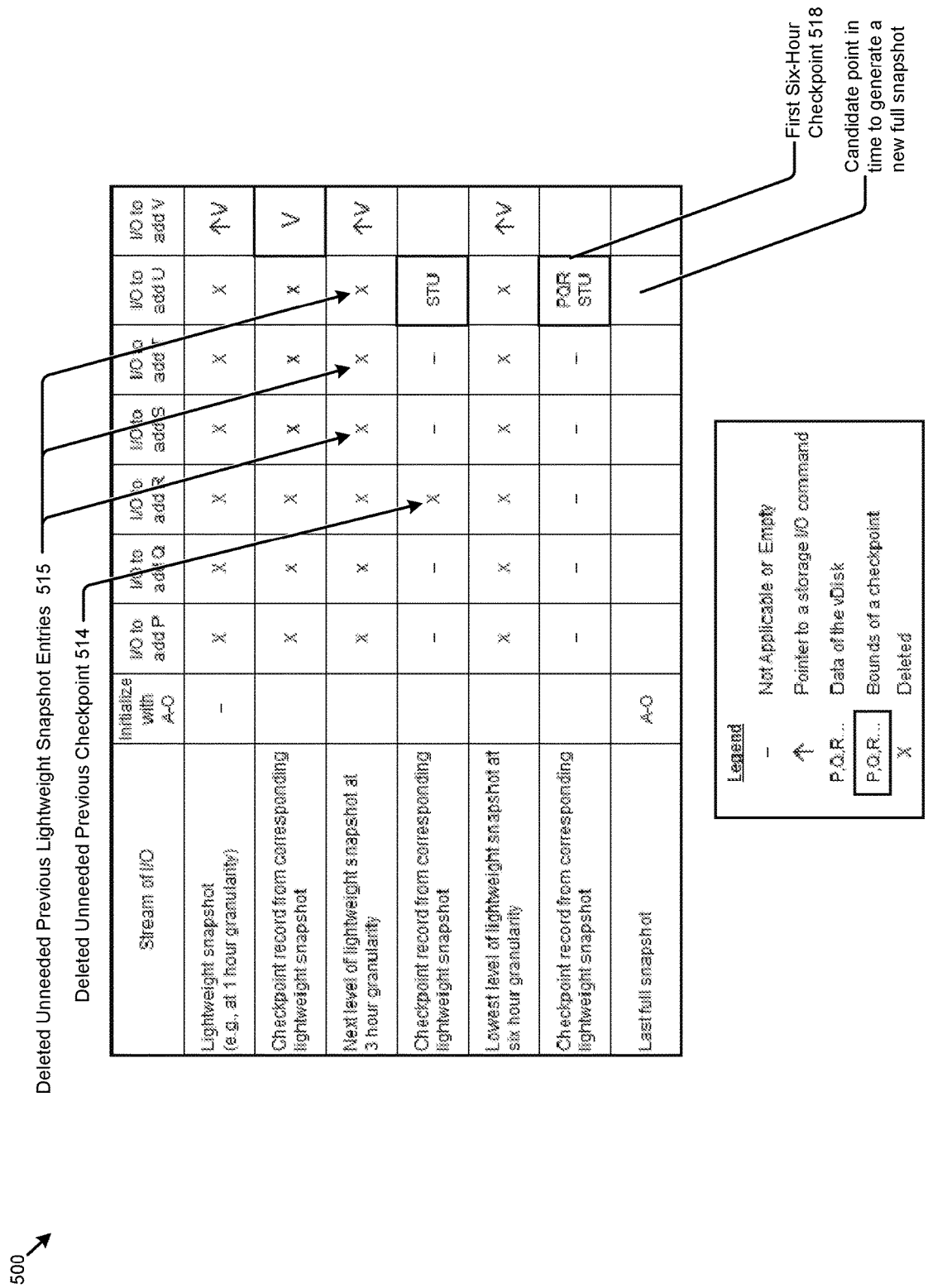

Deletion of the shown previous checkpoint 513 and deletion of the previous lightweight snapshot is shown in FIG. 5H as deleted unneeded previous checkpoint 514 and the three occurrences of deleted unneeded previous lightweight snapshot entries 515. FIG. 5H also shows the generation of the first six-hour checkpoint 518. Optionally at this point in time, it might be appropriate to generate a new full snapshot which would comprise "A-O", plus "PQR", plus "STU". Candidate points in time to generate a new full snapshot might include those points in time when a particular level of the staging area is closed.

Incoming I/Os need not be suspended or delayed during processing of lightweight snapshots. Strictly as one example to show this characteristic, during the formation of the shown first six-hour checkpoint 518, any additional I/Os may be issued and processed through a storage I/O capture module. This is shown in FIG. 5H by the depiction of the "I/O to add V". The occurrence of the "I/O to add V" does not affect the formation or contents of checkpoints or full snapshots.

In one or more of the envisioned use models of the embodiments, in the event of a restore (e.g., after a failure of some sort, or after an administrative signal to roll-back), the last full snapshot can be accessed, checkpoint records at successively higher levels of the staging areas are applied, and in the event there are any very recent I/Os that have not yet been applied to any checkpoint at any level, those I/Os can be then be applied. A model for restoration that uses the staging area content usage is exemplified in of FIG. 5I.

Figure 5I:
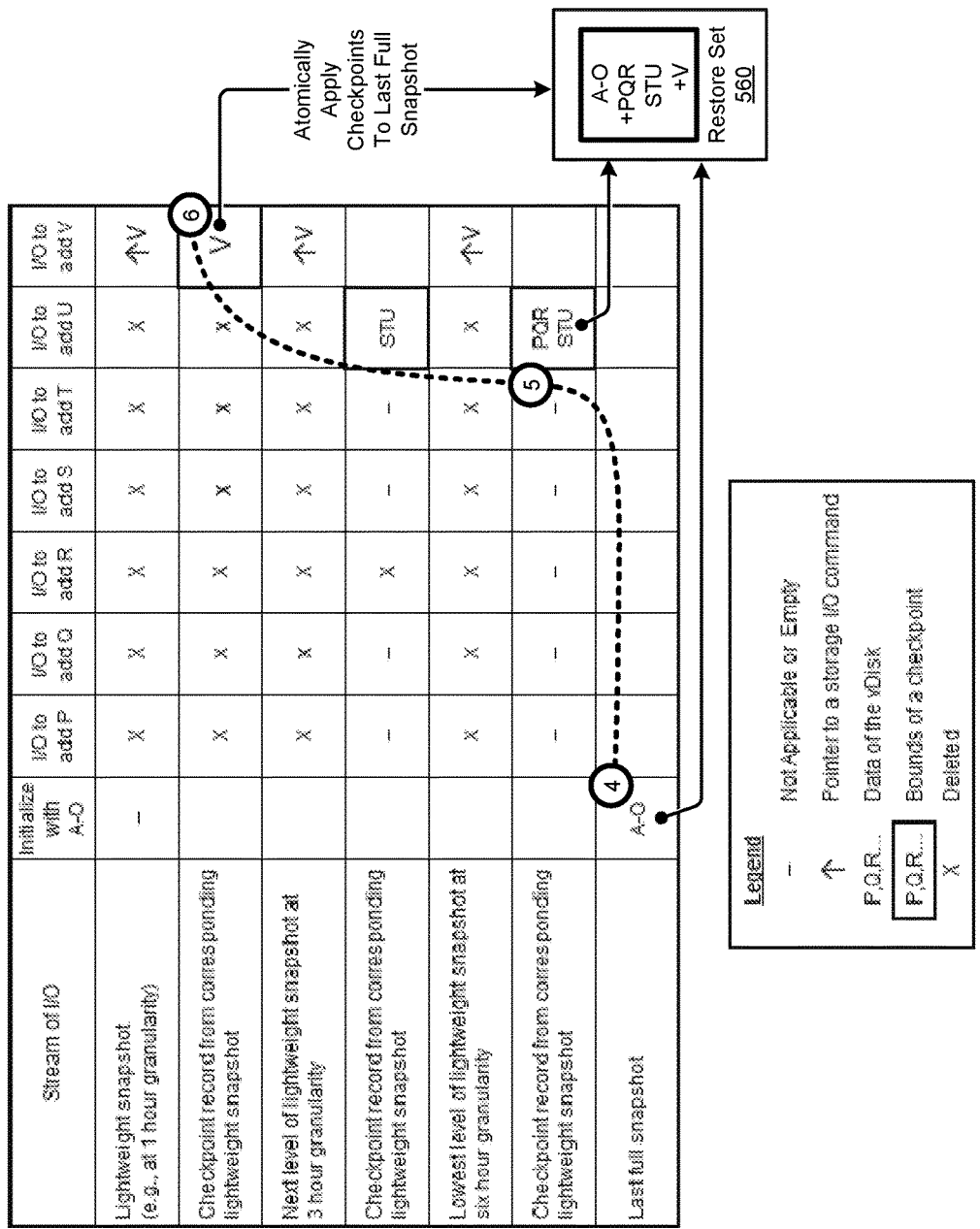
FIG. 5I depicts staging area content usage during performance of a restore operation in systems that employ multiple levels of lightweight snapshots, according to an embodiment.

FIG. 5I depicts staging area content usage 5I00 during performance of a restore operation in systems that employ multiple levels of lightweight snapshots. As an option, one or more variations of staging area content usage 5I00 or any aspect thereof may be implemented in the context of the architecture and functionality of the embodiments described herein. The staging area content usage 5I00 or any aspect thereof may be implemented in any environment.

The embodiment shown in FIG. 5I is merely one example. As shown, the staging area content usage serves to reduce the storage usage involved in persisting backup data at a high frequency while still facilitating fast restores up to the most recent I/O.

To do this, the staging area data is accessed to apply checkpoints from the highest applicable level of granularity until only I/Os that have not yet been applied to a checkpoint record remain. Such I/Os that have not yet been applied to a checkpoint record are available either via a lightweight snapshot data structure or from I/Os that have not yet been processed into a lightweight snapshot data structure. Then those remaining I/Os that are outstanding are applied to form a restore set that is consistent with respect to the restored consistency group and is also up to date to the specified restore point.

In the specific example of FIG. 5I, suppose that just after the time of occurrence of the "I/O to add V" an event is raised that signals a user's or administrator's demand for a restoration point in time just after the time of occurrence of the "I/O to add V". In such a case, the last saved full snapshot can be accessed (operation 4). Then, as many checkpoints as are applicable for the restore point are applied, first from the checkpoint of a lower level (operation 5) and then from checkpoints at higher levels (operation 6), if any. In some cases (e.g., at certain moments in time where multiple checkpoints cover exactly the same time period), the checkpoint at a higher level need not be applied if the corresponding data had already been applied by application of a checkpoint of a lower level.

If there are remaining I/Os that have not been applied after as many checkpoints as are applicable for the restore point have been processed over the last full snapshot, then those remaining I/Os can be replayed to create a restore set that includes those remaining I/Os. As shown, the restore set 560 comprises "A-O" (which derives from the last full snapshot), plus the results of I/Os to add P, Q, R, S, T, and U (which derive from the six-hour checkpoint), plus the "I/O to add V" (which derives from the one-hour checkpoint). As can now be understood, using checkpoints from the staging area rather than replaying I/Os results in a short time between receipt of a signal to restore and completion of the restoration.

Figure 6:
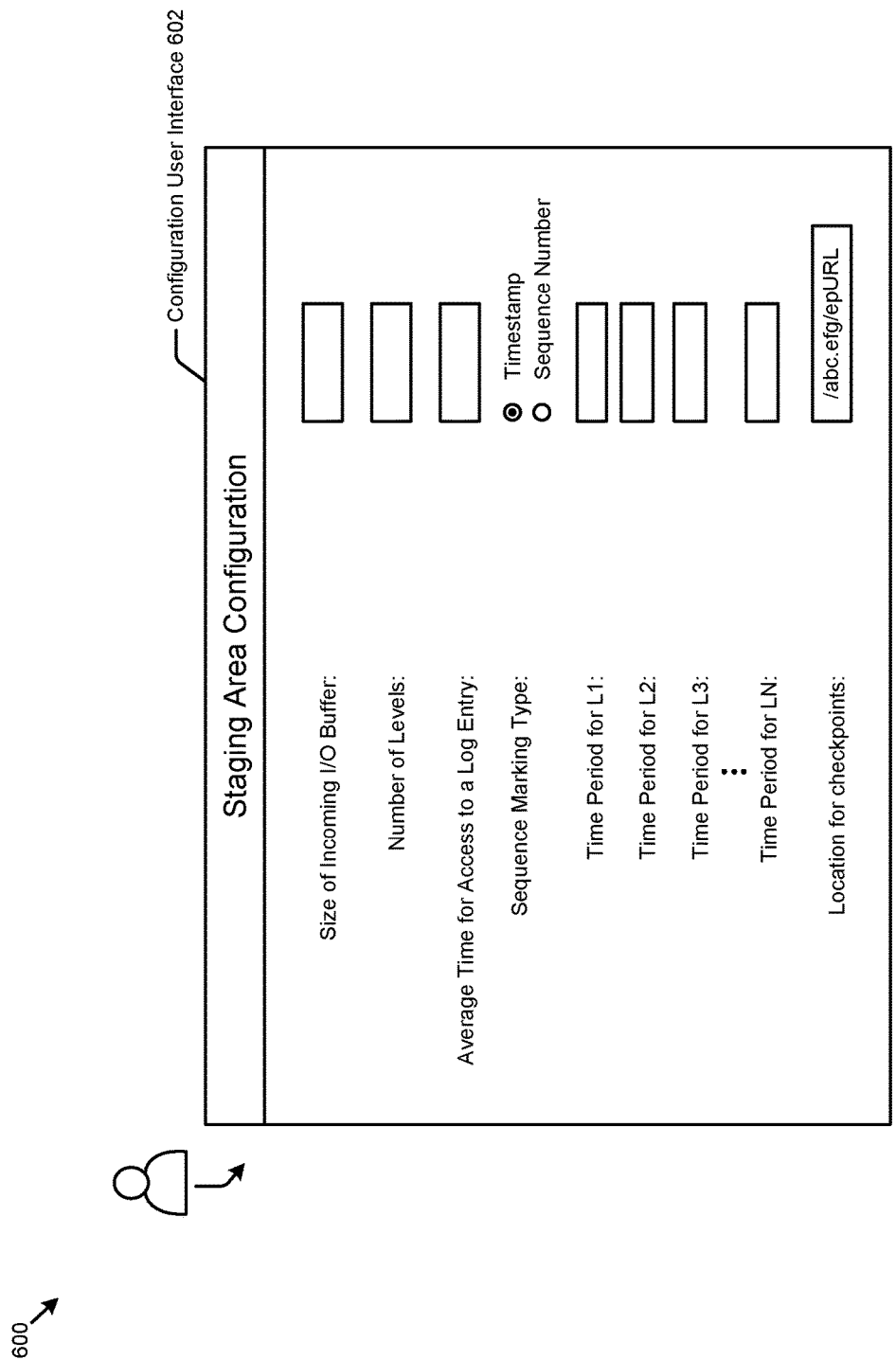
FIG. 6 presents a staging area configuration technique as used in systems that employ lightweight snapshot data structures in multiple staging levels, according to an embodiment.

FIG. 6 presents a staging area configuration technique 600 as used in systems that employ lightweight snapshot data structures in multiple staging levels. As an option, one or more variations of staging area configuration technique 600 or any aspect thereof may be implemented in the context of the architecture and functionality of the embodiments described herein. The staging area configuration technique 600 or any aspect thereof may be implemented in any environment.

The embodiment shown in FIG. 6 depicts an example configuration user interface 602. The user interface presents a series of questions to be answered by entering values into text boxes, or otherwise interacting with screen devices (e.g., pull-downs, radio button widgets, etc.). As shown, the of questions includes, "Size of Incoming I/O Buffer", "Number of Levels", "Average time for Access to a Log Entry" and so on. In some situations, the example configuration user interface 602 offers choices as to the type of sequence marking to be used when making entries into a lightweight snapshot data structure. The example configuration user interface 602 also asks the user to specify "Time Period for L1", "Time Period for L2", "Time Period for L3", "Time Period for LN", etc.

A location for checkpoint files can be entered using a text box, as shown, or by using a file chooser.

Figure 7:
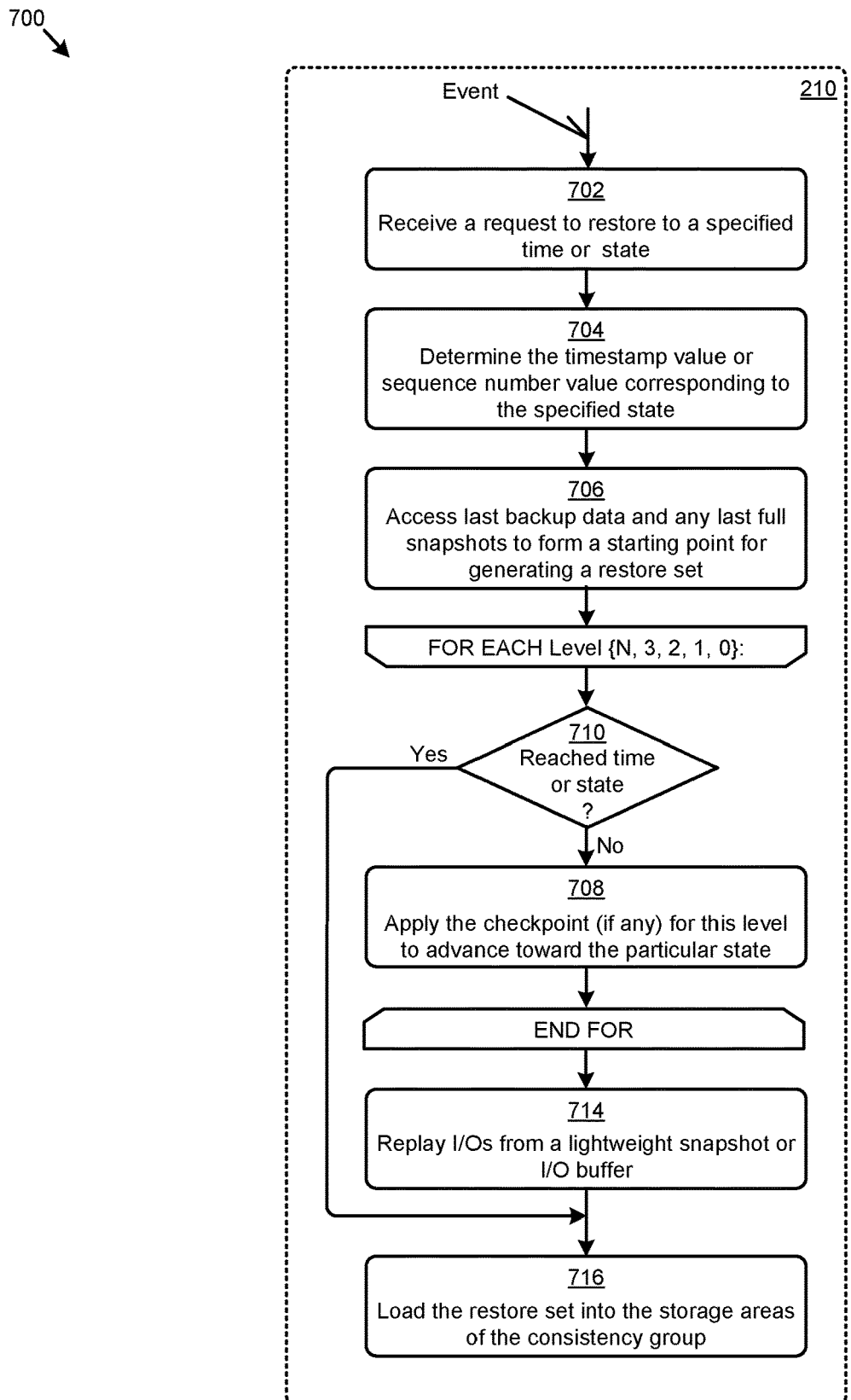
FIG. 7 is a flowchart depicting a state restoration technique as used in systems that employ multiple levels of lightweight snapshots in staging areas, according to an embodiment.

FIG. 7 is a flowchart depicting a state restoration technique 700 as used in systems that employ multiple levels of lightweight snapshots in staging areas. As an option, one or more variations of state restoration technique 700 or any aspect thereof may be implemented in the context of the architecture and functionality of the embodiments described herein. The state restoration technique 700 or any aspect thereof may be implemented in any environment.

The embodiment shown in FIG. 7 commences upon receipt of an event to restore a consistency group to a specified particular state (step 702). Step 704 serves to determine the timestamp or sequence number that is most coincident with the specified state. At step 706, an applicable set of backup data is accessed. Such backup data might include any combination of previous full backups and/or any set of incremental backups, and/or any previous full snapshot and/or set of full snapshots that had been saved to cover the consistency group to a particular (earlier) point in time.

In a FOR EACH loop that covers each level, from the least granular level to the most granular level (e.g., from N, to 0), the contents of the staging area at each particular level is assessed for applicability. Each time through the loop, a decision 710 is taken to determine if the restore set has indeed been constructed to cover changes up to the specified state. If so, the FOR EACH loop processing exits. If not, then at step 708, the checkpoint (if any) for this level is applied to the result set. In some cases, a checkpoint at a particular level might cover a time period or sequence of changes to reach a state that is later than the specified particular state to be restored. In such a case, the checkpoint from that level is not applied and, instead, the FOR EACH loop exits and I/Os are applied in accordance with step 714. Specifically, if at the moment of exiting the FOR EACH loop, the specified state had not been reached as a result of the application of the checkpoints, a lightweight snapshot that does include I/Os through to the specified state is identified, and the I/Os through to the specified state are applied. In some cases, only a certain segment of I/Os from a particular lightweight snapshot are applied (e.g., only those storage I/O commands that are needed to reach precisely the specified state).

When all applicable checkpoints have been applied and all I/O (if any) have been replayed to the specified time or state, then the restore set is complete and the restore set can be loaded into the storage areas of the consistency group (step 716).

Figure 8:
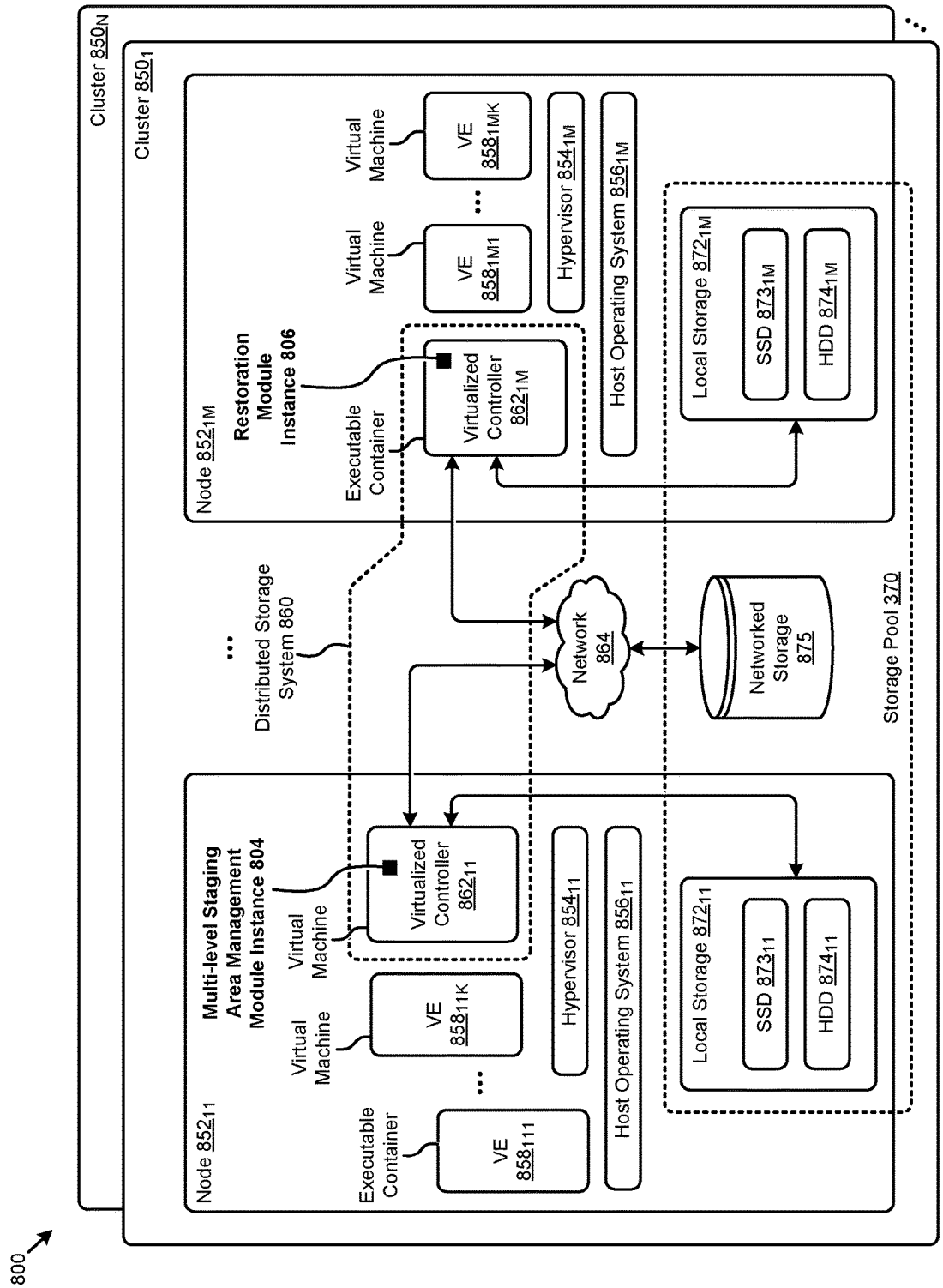
FIG. 8 is a block diagram of a computing system that hosts agents for forming and managing multiple levels of lightweight snapshots, according to an embodiment.

FIG. 8 is a block diagram of a computing system 800 that hosts agents for forming and managing multiple levels of lightweight snapshots. As an option, one or more variations of computing system 800 or any aspect thereof may be implemented in the context of the architecture and functionality of the embodiments described herein. The computing system 800 or any aspect thereof may be implemented in any environment.

The shown computing system 800 depicts various components associated with one instance of a distributed virtualization system (e.g., hyperconverged distributed system) comprising a distributed storage system 860 that can be used to implement the herein disclosed techniques. Specifically, the distributed virtualization system comprises multiple clusters (e.g., cluster $850_1$, . . . , cluster $850_N$) comprising multiple nodes that have multiple tiers of storage in a storage pool. Representative nodes (e.g., node $852_{11}$, . . . , node $852_{1M}$) and storage pool 370 associated with cluster $850_1$ are shown. Each node can be associated with one server, multiple servers, or portions of a server. The nodes can be associated (e.g., logically and/or physically) with the clusters. As shown, the multiple tiers of storage include storage that is accessible through a network 864, such as a networked storage 875 (e.g., a storage area network or SAN, network attached storage or NAS, etc.). The multiple tiers of storage further include instances of local storage (e.g., local storage $872_{11}$, . . . , local storage $872_{1M}$). For example, the local storage can be within or directly attached to a server and/or appliance associated with the nodes. Such local storage can include solid state drives (SSD $873_{11}$, . . . , SSD $873_{1M}$), hard disk drives (HDD $874_{11}$, . . . , HDD $874_{1M}$), and/or other storage devices.

As shown, any of the nodes of the distributed virtualization system can implement one or more user virtualized entities (e.g., VE $858_{111}$, . . . , VE $858_{11K}$, . . . , VE $858_{1M1}$, . . . , VE $858_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $856_{11}$, . . . , host operating system $856_{1M}$), while the VMs run multiple applications on various respective guest operating systems. Such flexibility can be facilitated at least in part by a hypervisor (e.g., hypervisor $854_{11}$, . . . , hypervisor $854_{1M}$), which hypervisor is logically located between the various guest operating systems of the VMs and the host operating system of the physical infrastructure (e.g., node).

As an example, hypervisors can be implemented using virtualization software that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $856_{11}$, . . . , host operating system $856_{1M}$) without, in most cases, a hypervisor layer. This lightweight implementation can facilitate efficient distribution of certain software components, such as applications or services (e.g., micro-services). As shown, distributed virtualization system can implement both a hypervisor-assisted virtualization environment and a container virtualization environment for various purposes.

The distributed virtualization system comprises at least one instance of a virtualized controller to facilitate access to storage pool by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 860 which can, among other operations, manage the storage pool 370. This architecture further facilitates efficient scaling of the distributed virtualization system. The foregoing virtualized controllers can be implemented in distributed virtualization systems using various techniques. Specifically, an instance of a virtual machine at a given node can be used as a virtualized controller in a hypervisor-assisted virtualization environment to manage storage and I/O (input/output or IO) activities. In this case, for example, the virtualized entities at node $852_{11}$ can interface with a controller virtual machine (e.g., virtualized controller $862_{11}$) through hypervisor $854_{11}$ to access the storage pool. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 860.

For example, a hypervisor at one node in the distributed storage system 860 might correspond to a first vendor's software, and a hypervisor at another node in the distributed storage system 860 might correspond to a second vendor's software. As another virtualized controller implementation example, containers (e.g., Docker containers) can be used to implement a virtualized controller (e.g., virtualized controller $862_{1M}$) in an operating system virtualization environment at a given node. In this case, for example, the virtualized entities at node $852_{1M}$ can access the storage pool 370 by interfacing with a controller container (e.g., virtualized controller $862_{1M}$) through hypervisor $854_{1M}$ and/or the kernel of host operating system $856_{1M}$.

In certain embodiments, one or more instances of an agent can be implemented in the distributed storage system 860 to facilitate the herein disclosed techniques. Specifically, a multi-level staging area management module instance 804 can be implemented in the virtualized controller $862_{11}$, and a restoration module instance 806 can be implemented in the virtualized controller $862_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Any aspect or aspects of any of the foregoing embodiments can be implemented in the context of the foregoing environment.

Additional Embodiments of the Disclosure

Additional Practical Application Examples

Figure 9A:
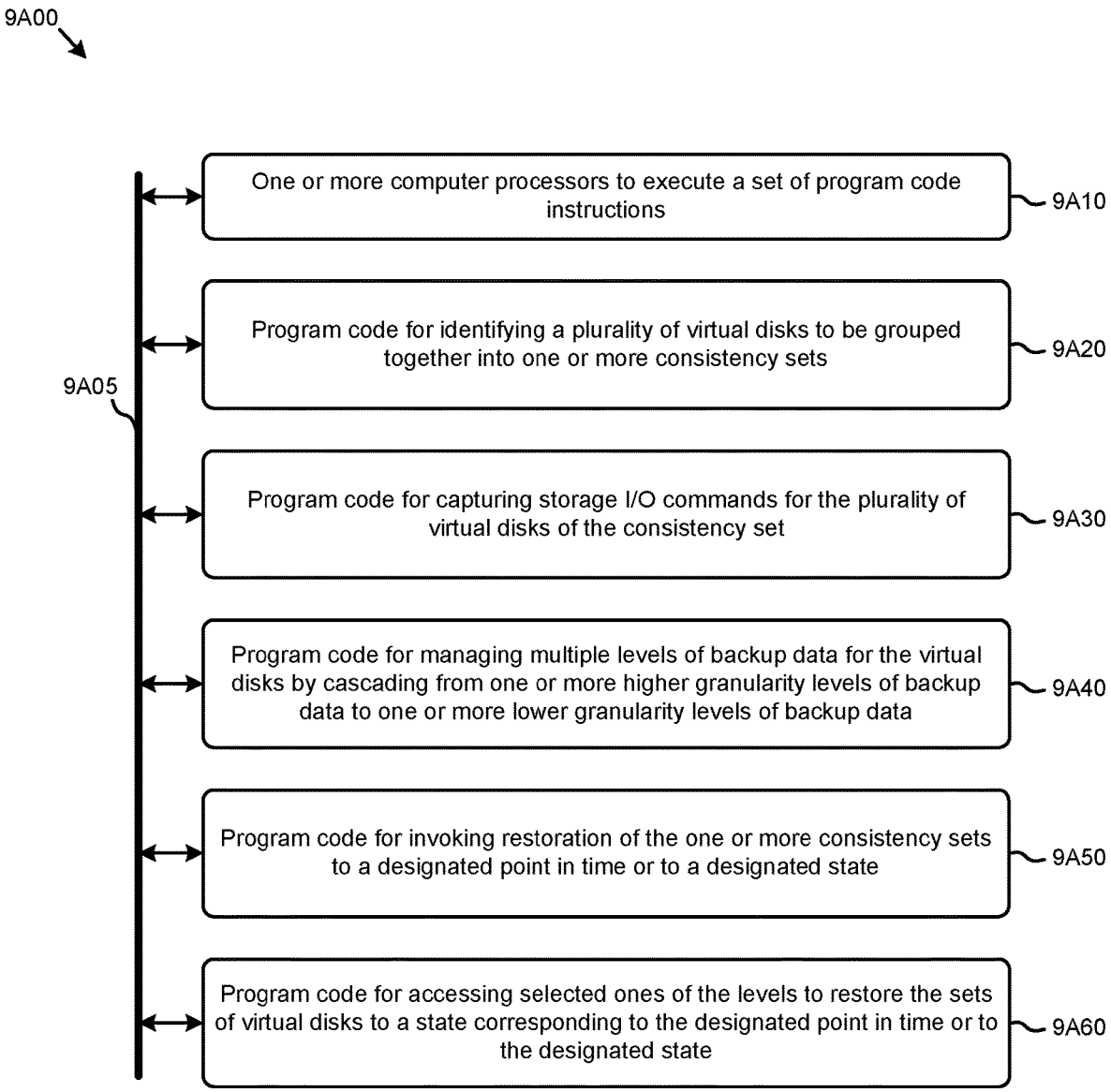
FIG. 9A and FIG. 9B depict system components as arrangements of computing modules that are interconnected so as to implement certain of the herein-disclosed embodiments.

FIG. 9A depicts a system 9A00 as an arrangement of computing modules that are interconnected so as to operate cooperatively to implement certain of the herein-disclosed embodiments. This and other embodiments present particular arrangements of elements that, individually and/or as combined, serve to form improved technological processes that address providing a high performance highly granular restore capability while observing data storage quotas. The partitioning of system 9A00 is merely illustrative and other partitions are possible. As an option, the system 9A00 may be implemented in the context of the architecture and functionality of the embodiments described herein. Of course, however, the system 9A00 or any operation therein may be carried out in any desired environment. The system 9A00 comprises at least one processor and at least one memory, the memory serving to store program instructions corresponding to the operations of the system. As shown, an operation can be implemented in whole or in part using program instructions accessible by a module. The modules are connected to a communication path 9A05, and any operation can communicate with other operations over communication path 9A05. The modules of the system can, individually or in combination, perform method operations within system 9A00. Any operations performed within system 9A00 may be performed in any order unless as may be specified in the claims. The shown embodiment implements a portion of a computer system, presented as system 9A00, comprising one or more computer processors to execute a set of program code instructions (module 9A10) and modules for accessing memory to hold program code instructions to perform: identifying a plurality of virtual disks to be grouped together into one or more consistency sets (module 9A20); capturing storage I/O commands for the plurality of virtual disks of the consistency set (module 9A30); managing multiple levels of backup data for the virtual disks by cascading from one or more higher granularity levels of backup data to one or more lower granularity levels of backup data (module 9A40); invoking restoration of the one or more consistency sets to a designated point in time or to a designated state (module 9A50); and accessing selected ones of the levels to restore the sets of virtual disks to a state corresponding to the designated point in time or to the designated state (module 9A60).

Variations of the foregoing may include more or fewer of the shown modules. Certain variations may perform more or fewer (or different) steps, and/or certain variations may use data elements in more, or in fewer (or different) operations.

Still further, some embodiments include variations in the operations performed, and some embodiments include variations of aspects of the data elements used in the operations.

Figure 9B:
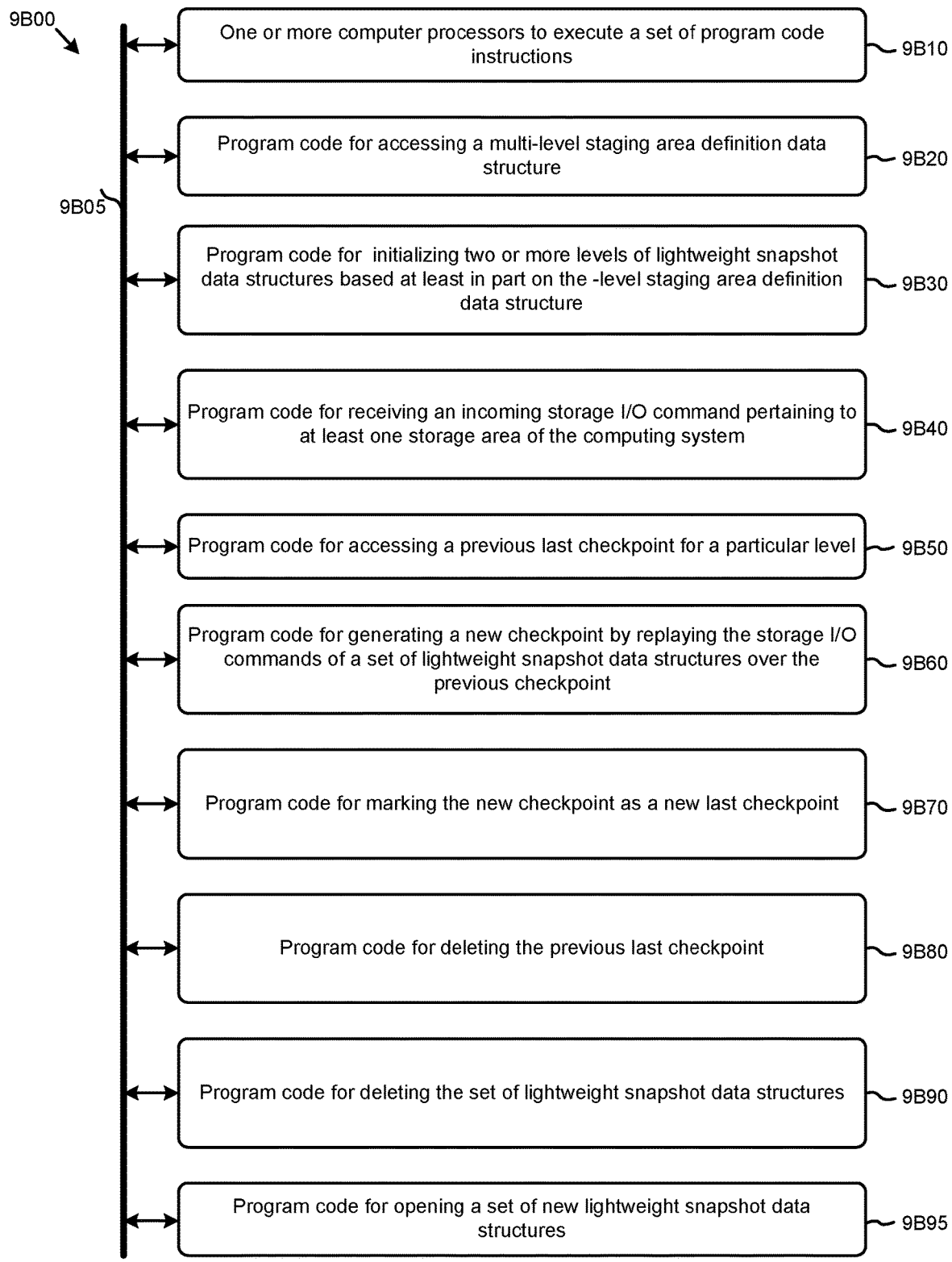

FIG. 9B depicts a system 9B00 as an arrangement of computing modules that are interconnected so as to operate cooperatively to implement certain of the herein-disclosed embodiments. The partitioning of system 9B00 is merely illustrative and other partitions are possible. As an option, the system 9B00 may be implemented in the context of the architecture and functionality of the embodiments described herein. Of course, however, the system 9B00 or any operation therein may be carried out in any desired environment.

The system 9B00 comprises at least one processor and at least one memory, the memory serving to store program instructions corresponding to the operations of the system. As shown, an operation can be implemented in whole or in part using program instructions accessible by a module. The modules are connected to a communication path 9B05, and any operation can communicate with other operations over communication path 9B05. The modules of the system can, individually or in combination, perform method operations within system 9B00. Any operations performed within system 9B00 may be performed in any order unless as may be specified in the claims.

The shown embodiment implements a portion of a computer system, presented as system 9B00, comprising one or more computer processors to execute a set of program code instructions (module 9B 10) and modules for accessing memory to hold program code instructions to perform: accessing a multi-level staging area definition data structure (module 9B20); initializing two or more levels of lightweight snapshot data structures based at least in part on the -level staging area definition data structure (module 9B30); receiving an incoming storage I/O command pertaining to at least one storage area of the computing system (module 9B40); accessing a previous last checkpoint for a particular level (module 9B50); generating a new checkpoint record (e.g., a new last checkpoint record) by replaying the storage I/O commands of a set of lightweight snapshot data structures over the previous checkpoint record (module 9B60); marking the new checkpoint as a new last checkpoint record (module 9B70); deleting the previous last checkpoint (module 9B80); deleting the set of lightweight snapshot data structures (module 9B90); and opening a set of new lightweight snapshot data structures (module 9B95).

System Architecture Overview
Additional System Architecture Examples

Figure 10A:
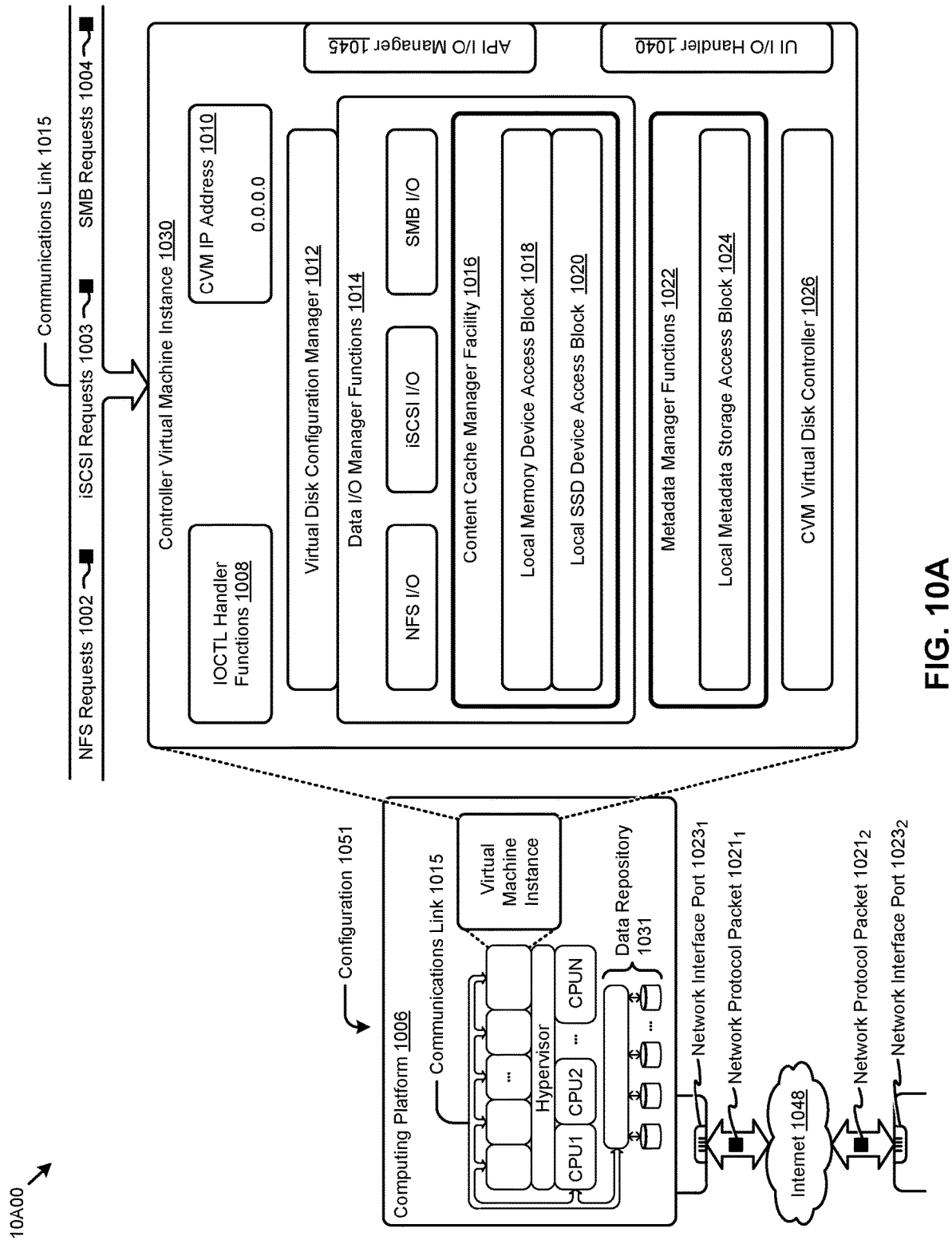
FIG. 10A, FIG. 10B, and FIG. 10C depict virtualized controller architectures comprising collections of interconnected components suitable for implementing embodiments of the present disclosure and/or for use in the herein-described environments.

FIG. 10A depicts a virtualized controller as implemented by the shown virtual machine architecture 10A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 10A00 comprises a collection of interconnected components suitable for implementing embodiments of the present disclosure and/or for use in the herein-described environments. Moreover, virtual machine architecture 10A00 includes a virtual machine instance in configuration 1051 that is further described as pertaining to controller virtual machine instance 1030. Configuration 1051 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 1030.

In this and other configurations, a controller virtual machine instance receives block I/O (input/output or IO) storage requests as network file system (NFS) requests in the form of NFS requests 1002, and/or internet small computer storage interface (iSCSI) block IO requests in the form of iSCSI requests 1003, and/or Samba file system (SMB) requests in the form of SMB requests 1004. The controller virtual machine (CVM) instance publishes and responds to an internet protocol (IP) address (e.g., CVM IP address 1010). Various forms of input and output (I/O or IO) can be handled by one or more IO control handler functions (e.g., IOCTL handler functions 1008) that interface to other functions such as data IO manager functions 1014 and/or metadata manager functions 1022. As shown, the data IO manager functions can include communication with virtual disk configuration manager 1012 and/or can include direct or indirect communication with any of various block IO functions (e.g., NFS IO, iSCSI IO, SMB IO, etc.).

In addition to block IO functions, configuration 1051 supports IO of any form (e.g., block IO, streaming IO, packet-based IO, HTTP traffic, etc.) through either or both of a user interface (UI) handler such as UI IO handler 1040 and/or through any of a range of application programming interfaces (APIs), possibly through API IO manager 1045.

Communications link 1015 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media.

Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 1030 includes content cache manager facility 1016 that accesses storage locations, possibly including local dynamic random access memory (DRAM) (e.g., through local memory device access block 1018) and/or possibly including accesses to local solid state storage (e.g., through local SSD device access block 1020).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 1031, which in turn can be formatted into any one or more storage areas, and which can comprise parameterized storage accessible by a key (e.g., a filename, a table name, a block address, an offset address, etc.). External data repository 1031 can store any forms of data and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 1024. External data repository 1031 can be configured using CVM virtual disk controller 1026, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, ... , CPUN). According to certain embodiments of the disclosure, two or more instances of configuration 1051 can be coupled by communications link 1015 (e.g., backplane, LAN, PSTN, wired or wireless network, etc.) and each instance may perform respective portions of sequences of instructions as may be required to practice embodiments of the disclosure.

The shown computing platform 1006 is interconnected to the Internet 1048 through one or more network interface ports (e.g., network interface port $1023_1$ and network interface port $1023_2$). Configuration 1051 can be addressed through one or more network interface ports using an IP address. Any operational element within computing platform 1006 can perform sending and receiving operations using any of a range of network protocols, possibly including network protocols that send and receive packets (e.g., network protocol packet 10211 and network protocol packet 10212).

Computing platform 1006 may transmit and receive messages that can be composed of configuration data and/or any other forms of data and/or instructions organized into a data structure (e.g., communications packets). In some cases, the data structure includes program code instructions (e.g., application code) communicated through the Internet 1048 and/or through any one or more instances of communications link 1015. Received program code may be processed and/or executed by a CPU as it is received and/or program code may be stored in any volatile or non-volatile storage for later execution. Program code can be transmitted via an upload (e.g., an upload from an access device over the Internet 1048 to computing platform 1006). Further, program code and/or the results of executing program code can be delivered to a particular user via a download (e.g., a download from computing platform 1006 over the Internet 1048 to an access device).

Configuration 1051 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to forming and managing multiple levels of lightweight snapshots. In some embodiments, a module may include one or more state machines and/or combinational logic used to implement or facilitate the operational and/or performance characteristics pertaining to forming and managing multiple levels of lightweight snapshots.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of forming and managing multiple levels of lightweight snapshots). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to forming and managing multiple levels of lightweight snapshots, and/or for improving the way data is manipulated when performing computerized operations pertaining to forming and managing multiple levels of lightweight snapshots.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 10B:
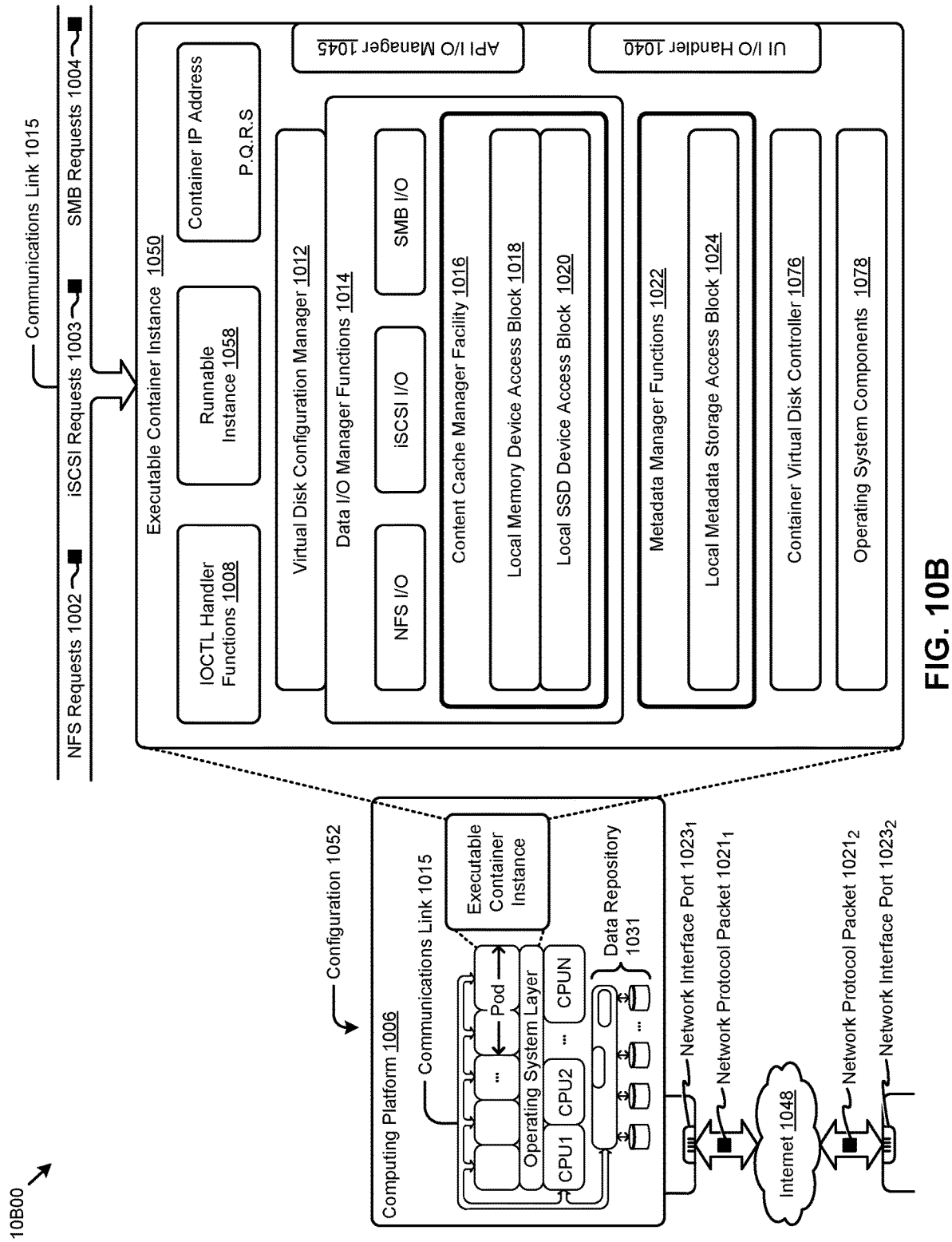

FIG. 10B depicts a virtualized controller implemented by containerized architecture 10B00. The containerized architecture comprises a collection of interconnected components suitable for implementing embodiments of the present disclosure and/or for use in the herein-described environments. Moreover, the shown containerized architecture 10B00 includes an executable container instance in configuration 1052 that is further described as pertaining to executable container instance 1050. Configuration 1052 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 1050). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system and can be configured to be accessed by file system commands (e.g., "ls" or "ls-a", etc.). The executable container might optionally include operating system components 1078, however such a separate set of operating system components need not be provided. As an alternative, an executable container can include runnable instance 1058, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 1076. Such a container virtual disk controller can perform any of the functions that the aforementioned CVM virtual disk controller 1026 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 10C:
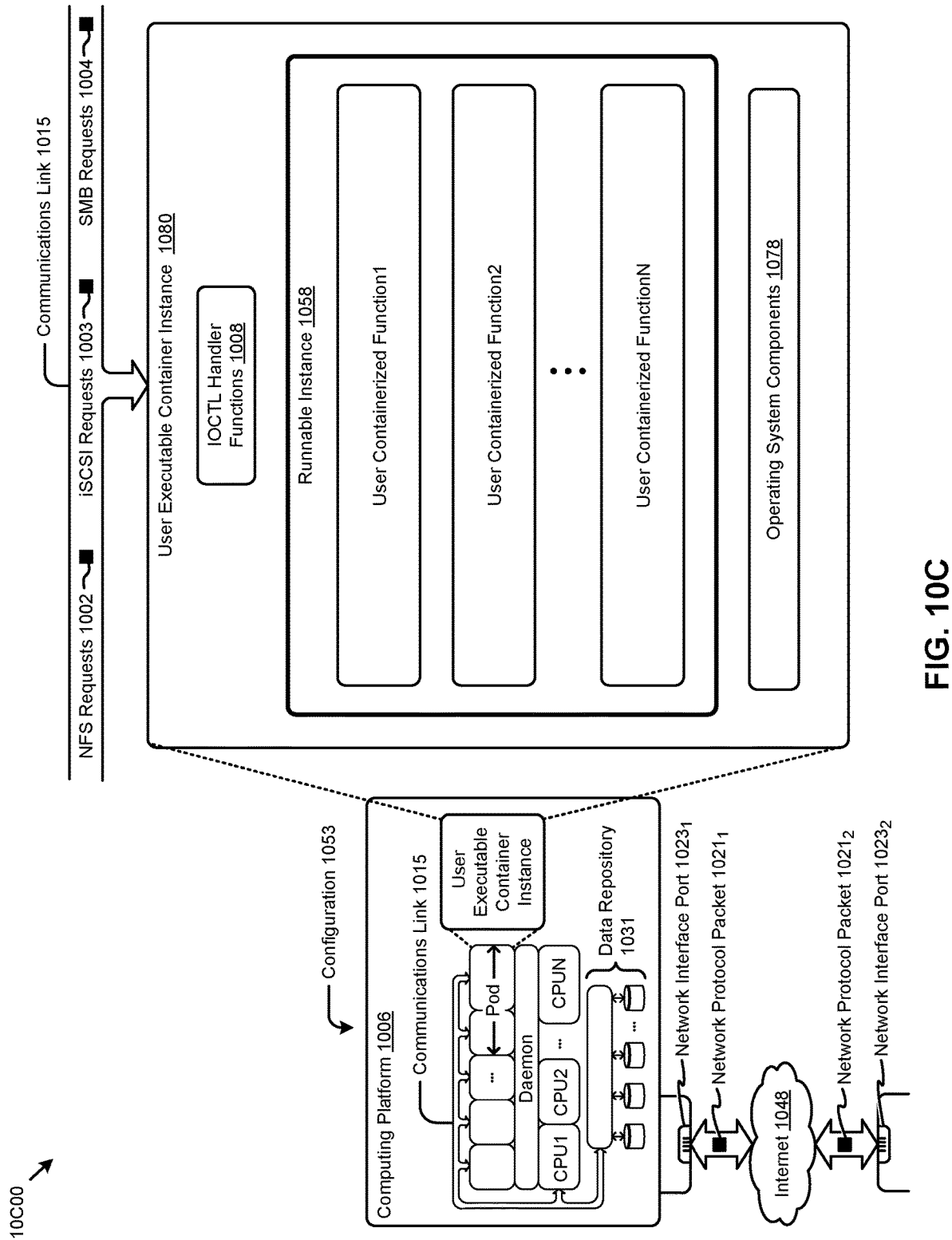

FIG. 10C depicts a virtualized controller implemented by a daemon-assisted containerized architecture 10C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 1053 that is further described as pertaining to user executable container instance 1080. Configuration 1053 includes a daemon layer (as shown) that performs certain functions of an operating system.

User executable container instance 1080 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 1058). In some cases, the shown operating system components 1078 comprise portions of an operating system, which portions are interfaced with or included in the runnable instance and/or any user containerized functions. In this embodiment of a daemon-assisted containerized architecture, the computing platform 1006 might or might not host operating system components other than operating system components 1078. More specifically, the shown daemon might or might not host operating system components other than operating system components 1078 of user executable container instance 1080.

The virtual machine architecture 10A00 of FIG. 10A and/or the containerized architecture 10B00 of FIG. 10B and/or the daemon-assisted containerized architecture 10C00 of FIG. 10C can be used in any combination to implement a distributed platform that contains multiple servers and/or nodes that manage multiple tiers of storage where the tiers of storage might be formed using the shown external data repository 1031 and/or any forms of network accessible storage. As such, the multiple tiers of storage may include storage that is accessible over communications link 1015. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 1051 of FIG. 10A) to manage the interactions between the underlying hardware and user virtual machines or containers that run client software.

Distinct from user virtual machines or user executable containers, a special controller virtual machine (e.g., as depicted by controller virtual machine instance 1030) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
maintaining snapshot data structures at first and second granularity levels and checkpoint records at the first and second granularity levels to facilitate recovery of respective data states to a target storage area, wherein the first granularity level corresponds to a first time period and the second granularity level corresponds to a second time period, and the second time period is longer than the first time period;
wherein respective snapshot data structures at the first and second granularity levels are generated by:
storing, in a respective snapshot data structure, a plurality of storage input/output (I/O) commands received during a corresponding time period,
wherein storage I/O commands comprise commands to write to a storage area of a computing system, and
wherein respective checkpoint records at the first and second granularity levels are generated by:
replaying storage I/O commands from a particular snapshot data structure over a previously generated checkpoint record to generate a respective checkpoint record and the respective checkpoint record comprises a backup of a respective data state of a respective storage area of a respective computing system at a respective time.

2. The method of claim 1, wherein deleting a previously generated checkpoint record, and a snapshot data structure used to generate the previously generated checkpoint record after generating a later checkpoint record.

3. The method of claim 1, further comprising initializing a new snapshot data structure to hold at least one of, a pointer to a buffer that holds storage I/O commands, or a pointer to a storage I/O command stream.

4. The method of claim 1, further comprising analyzing a characteristic of an incoming one of the plurality of storage I/O commands to determine a type of storage of a corresponding snapshot entry.

5. The method of claim 4, wherein the type of storage is at least one of, a pointer to a memory location in a buffer, an identifier to a log entry in a storage I/O stream, or a copy of the incoming one of the plurality of storage I/O commands.

6. The method of claim 1, further comprising deleting a lowest granularity checkpoint after it is applied to a full snapshot, wherein the storage area of the computing system is a storage pool that stores the full snapshot, and the lowest granularity checkpoint is applied to the full snapshot, the full snapshot maintaining a data state at a given time.

7. The method of claim 1, wherein the plurality of storage I/O commands is produced by a virtual machine that is a member of a consistency group, wherein the snapshot data structures, and the checkpoint records, are generated for the consistency group.

8. A non-transitory computer readable medium having stored thereon a sequence of instructions which, when stored in memory and executed by a processor causes a set of acts comprising:
maintaining snapshot data structures at first and second granularity levels and checkpoint records at the first and second granularity levels to facilitate recovery of respective data states to a target storage area, wherein the first granularity level corresponds to a first time period and the second granularity level corresponds to a second time period, and the second time period is longer than the first time period;
wherein respective snapshot data structures at the first and second granularity levels are generated by:
storing, in a respective snapshot data structure, a plurality of storage input/output (I/O) commands received during a corresponding time period,
wherein storage I/O commands comprise commands to write to a storage area of a computing system, and
wherein respective checkpoint records at the first and second granularity levels are generated by:
replaying storage I/O commands from a particular snapshot data structure over a previously generated checkpoint record to generate a respective checkpoint record and the respective checkpoint record comprises a backup of a respective data state of a respective storage area of a respective computing system at a respective time.

9. The computer readable medium of claim 8, wherein deleting a previously generated checkpoint record, and a snapshot data structure used to generate the previously generated checkpoint record after generating a later checkpoint record.

10. The computer readable medium of claim 8, wherein the set of acts further comprise initializing a new snapshot data structure to hold at least one of, a pointer to a buffer that holds storage I/O commands, or a pointer to a storage I/O command stream.

11. The computer readable medium of claim 8, wherein the set of acts further comprise analyzing a characteristic of an incoming one of the plurality of storage I/O commands to determine a type of storage of a corresponding snapshot entry.

12. The computer readable medium of claim 11, wherein the type of storage is at least one of, a pointer to a memory location in a buffer, an identifier to a log entry in a storage I/O stream, or a copy of the incoming one of the plurality of storage I/O commands.

13. The computer readable medium of claim 11, wherein the type of storage is a memory location in a buffer for a consistency group.

14. The computer readable medium of claim 8, further comprising deleting a lowest granularity checkpoint after it is applied to a full snapshot, wherein the storage area of the computing system is a storage pool that stores the full snapshot, and a lowest granularity checkpoint is applied to the full snapshot, the full snapshot maintaining a data state at a given time.

15. The computer readable medium of claim 8, wherein the plurality of storage I/O commands is produced by a virtual machine that is a member of a consistency group, wherein the snapshot data structures, and the checkpoint records are generated for the consistency group.

16. A system comprising: a storage medium having stored thereon a set of instructions; and a processor that executes the set of instructions to cause a set of acts comprising,
maintaining snapshot data structures at first and second granularity levels and checkpoint records at the first and second granularity levels to facilitate recovery of respective data states to a target storage area, wherein the first granularity level corresponds to a first time period and the second granularity level corresponds to a second time period, and the second time period is longer than the first time period;
wherein respective snapshot data structures at the first and second granularity levels are generated by:
storing, in a respective snapshot data structure, a plurality of storage input/output (I/O) commands received during a corresponding time period, wherein storage I/O commands comprise commands to write to a storage area of a computing system, and
wherein respective checkpoint records at the first and second granularity levels are generated by:
replaying storage I/O commands from a particular snapshot data structure over a previously generated checkpoint record to generate a respective checkpoint record and the respective checkpoint record comprises a backup of a respective data state of a respective storage area of a respective computing system at a respective time.

17. The system of claim 16, wherein deleting a previously generated checkpoint record, and a snapshot data structure used to generate the previously generated checkpoint record after generating a later checkpoint record.

18. The system of claim 16, wherein the set of acts further comprise initializing a new snapshot data structure to hold at least one of, a pointer to a buffer that holds storage I/O commands, or a pointer to a storage I/O command stream.

19. The system of claim 16, wherein the set of acts further comprise analyzing a characteristic of an incoming one of the plurality of storage I/O commands to determine a type of storage of a corresponding snapshot entry.

20. The system of claim 19, wherein the type of storage is at least one of, a pointer to a memory location in a buffer, an identifier to a log entry in a storage I/O stream, or a copy of the incoming one of the plurality of storage I/O commands.

21. The system of claim 16, further comprising deleting a lowest granularity checkpoint after it is applied to a full snapshot, wherein the storage area of the computing system is a storage pool that stores a full snapshot, and a lowest granularity checkpoint is applied to the full snapshot, the full snapshot maintaining a data state at a given time.

22. The system of claim 16, wherein the plurality of storage I/O commands is produced by a virtual machine that is a member of a consistency group, wherein the snapshot data structures, and the checkpoint records, are generated for the consistency group.

\* \* \* \* \*